(12) United States Patent
Tehranchi et al.

(10) Patent No.: US 8,781,967 B2
(45) Date of Patent: Jul. 15, 2014

(54) WATERMARKING IN AN ENCRYPTED DOMAIN

(75) Inventors: Babak Tehranchi, San Diego, CA (US); Rade Petrovic, San Diego, CA (US)

(73) Assignee: Verance Corporation, San Diego, CA (US)

( * ) Notice: Subject to any disclaimer, the term of this patent is extended or adjusted under 35 U.S.C. 154(b) by 1123 days.

(21) Appl. No.: 11/482,519

(22) Filed: Jul. 7, 2006

(65) Prior Publication Data

US 2007/0110237 A1 May 17, 2007

Related U.S. Application Data

(60) Provisional application No. 60/697,515, filed on Jul. 7, 2005.

(51) Int. Cl.
*G06F 21/00* (2013.01)

(52) U.S. Cl.
USPC .................. 705/50; 705/51; 705/54; 705/57; 380/227; 380/228; 380/229; 380/230

(58) Field of Classification Search
CPC ....................................... G06F 21/00
USPC ......................................... 705/50
See application file for complete search history.

(56) References Cited

U.S. PATENT DOCUMENTS

| | | |
|---|---|---|
| 3,406,344 A | 10/1968 | Hopper |
| 3,842,196 A | 10/1974 | Loughlin |
| 3,885,217 A | 5/1975 | Cintron |
| 3,894,190 A | 7/1975 | Gassmann |
| 3,919,479 A | 11/1975 | Moon et al. |
| 3,973,206 A | 8/1976 | Haselwood et al. |
| 4,048,562 A | 9/1977 | Haselwood et al. |
| 4,176,379 A | 11/1979 | Wessler et al. |
| 4,199,788 A | 4/1980 | Tsujimura |

(Continued)

FOREIGN PATENT DOCUMENTS

| | | |
|---|---|---|
| CA | 2276638 A1 | 1/2000 |
| EP | 282734 A1 | 9/1988 |

(Continued)

OTHER PUBLICATIONS

Epp et al., "Generalized Scattering Matrices for Unit Cell Characterization of Grid Amplifiers and Device De-Embedding", IEEE vol. 2, Jun. 1995, pp. 1288-1291.

(Continued)

*Primary Examiner* — James A Reagan
(74) *Attorney, Agent, or Firm* — Perkins Coie LLP; Donald L. Wenskay

(57) ABSTRACT

Methods, apparatus and systems for embedding auxiliary information in encrypted host signals are provided. The present invention enables secure application of digital watermarks at any point in the transmission and/or distribution of digital content by enabling the insertion of a plurality of digital watermarks, without the knowledge of the encryption/decryption keys, into a digital host content that has been encrypted with an encryption key. The embedded watermarks persist throughout the content subsequent to the decryption of the content. The disclosed techniques are applicable to content that has been encrypted using a variety of different encryption techniques and algorithms, including stream ciphers, block ciphers, symmetric and asymmetric encryption algorithms. These methods are further adapted to enable the insertion of watermarks into a content that is compressed prior to encryption.

27 Claims, 9 Drawing Sheets

(56) References Cited

U.S. PATENT DOCUMENTS

| | | |
|---|---|---|
| 4,225,967 A | 9/1980 | Miwa et al. |
| 4,230,990 A | 10/1980 | Lert, Jr. et al. |
| 4,281,217 A | 7/1981 | Dolby |
| 4,295,128 A | 10/1981 | Hashemian et al. |
| 4,425,578 A | 1/1984 | Haselwood et al. |
| 4,454,610 A | 6/1984 | Sziklai |
| 4,464,656 A | 8/1984 | Nakamura |
| 4,497,060 A | 1/1985 | Yang |
| 4,512,013 A | 4/1985 | Nash et al. |
| 4,547,804 A | 10/1985 | Greenberg |
| 4,564,862 A | 1/1986 | Cohen |
| 4,593,904 A | 6/1986 | Graves |
| 4,639,779 A | 1/1987 | Greenberg |
| 4,669,089 A | 5/1987 | Gahagan et al. |
| 4,677,466 A | 6/1987 | Lert, Jr. et al. |
| 4,686,707 A | 8/1987 | Iwasaki et al. |
| 4,703,476 A | 10/1987 | Howard |
| 4,706,282 A | 11/1987 | Knowd |
| 4,723,302 A | 2/1988 | Fulmer et al. |
| 4,729,398 A | 3/1988 | Benson et al. |
| 4,739,398 A | 4/1988 | Thomas et al. |
| 4,750,173 A | 6/1988 | Bluthgen |
| 4,755,871 A | 7/1988 | Morales-Garza et al. |
| 4,755,884 A | 7/1988 | Efron et al. |
| 4,764,608 A | 8/1988 | Masuzawa et al. |
| 4,764,808 A | 8/1988 | Solar |
| 4,789,863 A | 12/1988 | Bush |
| 4,805,020 A | 2/1989 | Greenberg |
| 4,807,013 A | 2/1989 | Manocha |
| 4,807,031 A | 2/1989 | Broughton et al. |
| 4,840,602 A | 6/1989 | Rose |
| 4,843,562 A | 6/1989 | Kenyon et al. |
| 4,876,617 A | 10/1989 | Best et al. |
| 4,876,736 A | 10/1989 | Kiewit |
| 4,930,011 A | 5/1990 | Kiewit |
| 4,931,871 A | 6/1990 | Kramer |
| 4,937,807 A | 6/1990 | Weitz et al. |
| 4,939,515 A | 7/1990 | Adelson |
| 4,943,963 A | 7/1990 | Waechter et al. |
| 4,945,412 A | 7/1990 | Kramer |
| 4,967,273 A | 10/1990 | Greenberg |
| 4,969,041 A | 11/1990 | O'Grady et al. |
| 4,972,471 A | 11/1990 | Gross et al. |
| 4,972,503 A | 11/1990 | Zurlinden |
| 4,979,210 A | 12/1990 | Nagata et al. |
| 5,057,915 A | 10/1991 | Von Kohorn |
| 5,073,925 A | 12/1991 | Nagata et al. |
| 5,080,479 A | 1/1992 | Rosenberg |
| 5,113,437 A | 5/1992 | Best et al. |
| 5,116,437 A | 5/1992 | Yamamoto et al. |
| 5,161,251 A | 11/1992 | Mankovitz |
| 5,191,615 A | 3/1993 | Aldava et al. |
| 5,200,822 A | 4/1993 | Bronfin et al. |
| 5,210,820 A | 5/1993 | Kenyon |
| 5,210,831 A | 5/1993 | Emma et al. |
| 5,213,337 A | 5/1993 | Sherman |
| 5,214,792 A | 5/1993 | Alwadish |
| 5,237,611 A | 8/1993 | Rasmussen et al. |
| 5,251,041 A | 10/1993 | Young et al. |
| 5,270,480 A | 12/1993 | Hikawa |
| 5,294,962 A | 3/1994 | Sato et al. |
| 5,294,982 A | 3/1994 | Salomon et al. |
| 5,319,453 A | 6/1994 | Copriviza et al. |
| 5,319,735 A | 6/1994 | Preuss et al. |
| 5,351,304 A | 9/1994 | Yamamoto |
| 5,379,345 A | 1/1995 | Greenberg |
| 5,402,488 A | 3/1995 | Karlock |
| 5,404,160 A | 4/1995 | Schober et al. |
| 5,404,377 A | 4/1995 | Moses |
| 5,408,258 A | 4/1995 | Kolessar |
| 5,414,729 A | 5/1995 | Fenton |
| 5,424,785 A | 6/1995 | Orphan |
| 5,425,100 A | 6/1995 | Thomas et al. |
| 5,432,799 A | 7/1995 | Shimpuku et al. |
| 5,436,653 A | 7/1995 | Ellis et al. |
| 5,450,490 A | 9/1995 | Jensen et al. |
| 5,452,901 A | 9/1995 | Nakada et al. |
| 5,473,631 A | 12/1995 | Moses |
| 5,481,294 A | 1/1996 | Thomas et al. |
| 5,497,372 A | 3/1996 | Nankoh et al. |
| 5,502,576 A | 3/1996 | Ramsay et al. |
| 5,504,518 A | 4/1996 | Ellis et al. |
| 5,508,754 A | 4/1996 | Orphan |
| 5,519,454 A | 5/1996 | Willis |
| 5,523,794 A | 6/1996 | Mankovitz et al. |
| 5,526,427 A | 6/1996 | Thomas et al. |
| 5,537,484 A | 7/1996 | Kobayashi |
| 5,579,124 A | 11/1996 | Aijala et al. |
| 5,581,658 A | 12/1996 | O'Hagan et al. |
| 5,581,800 A | 12/1996 | Fardeau et al. |
| 5,592,553 A | 1/1997 | Guski et al. |
| 5,612,729 A | 3/1997 | Ellis et al. |
| 5,613,004 A | 3/1997 | Cooperman et al. |
| 5,636,292 A | 6/1997 | Rhoads |
| 5,664,018 A | 9/1997 | Leighton |
| 5,687,191 A | 11/1997 | Lee et al. |
| 5,687,236 A | 11/1997 | Moskowitz et al. |
| 5,699,427 A | 12/1997 | Chow et al. |
| 5,719,619 A | 2/1998 | Hattori et al. |
| 5,719,937 A | 2/1998 | Warren et al. |
| 5,737,329 A | 4/1998 | Horiguchi |
| 5,752,880 A | 5/1998 | Gabai et al. |
| 5,761,606 A | 6/1998 | Wolzien |
| 5,764,763 A | 6/1998 | Jensen et al. |
| 5,778,108 A | 7/1998 | Coleman, Jr. |
| 5,787,334 A | 7/1998 | Fardeau et al. |
| 5,805,635 A | 9/1998 | Andrews, Jr. et al. |
| 5,809,064 A | 9/1998 | Fenton et al. |
| 5,809,139 A | 9/1998 | Girod et al. |
| 5,819,289 A | 10/1998 | Sanford, II et al. |
| 5,822,360 A | 10/1998 | Lee et al. |
| 5,822,432 A | 10/1998 | Moskowitz et al. |
| 5,825,892 A | 10/1998 | Braudaway et al. |
| 5,828,325 A | 10/1998 | Wolosewicz et al. |
| 5,832,119 A | 11/1998 | Rhoads |
| 5,841,978 A | 11/1998 | Rhoads |
| 5,848,155 A | 12/1998 | Cox |
| 5,850,249 A | 12/1998 | Massetti et al. |
| 5,850,481 A | 12/1998 | Rhoads |
| 5,862,260 A | 1/1999 | Rhoads |
| 5,870,030 A | 2/1999 | DeLuca et al. |
| 5,887,243 A | 3/1999 | Harvey et al. |
| 5,889,868 A | 3/1999 | Moskowitz et al. |
| 5,892,900 A | 4/1999 | Ginter et al. |
| 5,893,067 A | 4/1999 | Bender et al. |
| 5,901,178 A | 5/1999 | Lee et al. |
| 5,905,800 A | 5/1999 | Moskowitz et al. |
| 5,930,369 A | 7/1999 | Cox et al. |
| 5,933,798 A | 8/1999 | Linnartz |
| 5,937,000 A | 8/1999 | Lee et al. |
| 5,940,124 A | 8/1999 | Janko et al. |
| 5,940,134 A | 8/1999 | Wirtz |
| 5,940,135 A | 8/1999 | Petrovic et al. |
| 5,940,429 A | 8/1999 | Lam et al. |
| 5,943,422 A | 8/1999 | Van Wie et al. |
| 5,945,932 A | 8/1999 | Smith et al. |
| 5,949,885 A | 9/1999 | Leighton |
| 5,960,081 A | 9/1999 | Vynne et al. |
| 5,963,909 A | 10/1999 | Warren et al. |
| 5,986,692 A | 11/1999 | Logan et al. |
| 6,021,432 A | 2/2000 | Sizer, II et al. |
| 6,031,914 A | 2/2000 | Tewfik et al. |
| 6,035,171 A | 3/2000 | Takaya et al. |
| 6,035,177 A | 3/2000 | Moses et al. |
| 6,037,984 A | 3/2000 | Isnardi et al. |
| 6,044,156 A | 3/2000 | Honsinger et al. |
| 6,061,793 A | 5/2000 | Tewfik et al. |
| 6,067,440 A | 5/2000 | Diefes |
| 6,078,664 A | 6/2000 | Moskowitz et al. |
| 6,094,228 A | 7/2000 | Ciardullo et al. |
| 6,101,310 A | 8/2000 | Terada et al. |
| 6,128,597 A | 10/2000 | Kolluru et al. |
| 6,145,081 A | 11/2000 | Winograd et al. |
| 6,154,571 A | 11/2000 | Cox et al. |

(56) References Cited

U.S. PATENT DOCUMENTS

| | | | |
|---|---|---|---|
| 6,160,986 A | 12/2000 | Gabai et al. |
| 6,173,271 B1 | 1/2001 | Goodman et al. |
| 6,175,627 B1 | 1/2001 | Petrovic et al. |
| 6,189,123 B1 | 2/2001 | Anders Nystrom et al. |
| 6,209,092 B1 | 3/2001 | Linnartz |
| 6,209,094 B1 | 3/2001 | Levine et al. |
| 6,222,932 B1 | 4/2001 | Rao et al. |
| 6,229,572 B1 | 5/2001 | Ciardullo et al. |
| 6,233,347 B1 | 5/2001 | Chen et al. |
| 6,246,775 B1 | 6/2001 | Nakamura et al. |
| 6,246,802 B1 | 6/2001 | Fujihara et al. |
| 6,249,870 B1 | 6/2001 | Kobayashi et al. |
| 6,252,972 B1 | 6/2001 | Linnartz |
| 6,253,113 B1 | 6/2001 | Lu |
| 6,253,189 B1 | 6/2001 | Feezell et al. |
| 6,268,866 B1 | 7/2001 | Shibata |
| 6,278,792 B1 | 8/2001 | Cox et al. |
| 6,282,299 B1 | 8/2001 | Tewfik et al. |
| 6,285,774 B1 | 9/2001 | Schumann et al. |
| 6,289,108 B1 | 9/2001 | Rhoads |
| 6,290,566 B1 | 9/2001 | Gabai et al. |
| 6,330,335 B1 | 12/2001 | Rhoads |
| 6,330,672 B1 | 12/2001 | Shur |
| 6,332,031 B1 | 12/2001 | Rhoads et al. |
| 6,332,194 B1 | 12/2001 | Bloom et al. |
| 6,353,672 B1 | 3/2002 | Rhoads |
| 6,353,974 B1 | 3/2002 | Graf |
| 6,363,159 B1 | 3/2002 | Rhoads |
| 6,373,974 B2 | 4/2002 | Zeng |
| 6,374,036 B1 | 4/2002 | Ryan et al. |
| 6,381,341 B1 | 4/2002 | Rhoads |
| 6,385,330 B1 | 5/2002 | Powell et al. |
| 6,388,712 B1 | 5/2002 | Shinohara et al. |
| 6,389,152 B2 | 5/2002 | Nakamura et al. |
| 6,389,538 B1 | 5/2002 | Gruse et al. |
| 6,400,826 B1 | 6/2002 | Chen et al. |
| 6,404,781 B1 | 6/2002 | Kawamae et al. |
| 6,404,898 B1 | 6/2002 | Rhoads |
| 6,411,725 B1 | 6/2002 | Rhoads |
| 6,415,040 B1 | 7/2002 | Linnartz et al. |
| 6,415,041 B1 | 7/2002 | Oami et al. |
| 6,424,726 B2 | 7/2002 | Nakano et al. |
| 6,427,012 B1 | 7/2002 | Petrovic |
| 6,430,301 B1 | 8/2002 | Petrovic |
| 6,449,367 B2 | 9/2002 | Van Wie et al. |
| 6,449,496 B1 | 9/2002 | Beith et al. |
| 6,473,560 B1 | 10/2002 | Linnartz et al. |
| 6,477,431 B1 | 11/2002 | Kalker et al. |
| 6,487,301 B1 | 11/2002 | Zhao |
| 6,490,355 B1 | 12/2002 | Epstein |
| 6,496,591 B1 | 12/2002 | Rhoads |
| 6,505,160 B1 | 1/2003 | Levy et al. |
| 6,510,233 B1 | 1/2003 | Nakano |
| 6,510,234 B1 | 1/2003 | Cox et al. |
| 6,512,837 B1 | 1/2003 | Ahmed |
| 6,523,113 B1 | 2/2003 | Wehrenberg |
| 6,529,506 B1 | 3/2003 | Yamamoto et al. |
| 6,530,021 B1 | 3/2003 | Epstein et al. |
| 6,550,011 B1 | 4/2003 | Sims, III |
| 6,553,127 B1 | 4/2003 | Kurowski |
| 6,556,688 B1 | 4/2003 | Ratnakar |
| 6,557,103 B1 | 4/2003 | Boncelet, Jr. et al. |
| 6,570,996 B1 | 5/2003 | Linnartz |
| 6,571,144 B1 | 5/2003 | Moses et al. |
| 6,574,350 B1 | 6/2003 | Rhoads et al. |
| 6,577,744 B1 | 6/2003 | Braudaway et al. |
| 6,584,138 B1 | 6/2003 | Neubauer et al. |
| 6,590,996 B1 | 7/2003 | Reed et al. |
| 6,590,997 B2 | 7/2003 | Rhoads |
| 6,591,365 B1 | 7/2003 | Cookson |
| 6,592,516 B2 | 7/2003 | Lee |
| 6,598,162 B1 | 7/2003 | Moskowitz |
| 6,614,914 B1 | 9/2003 | Rhoads et al. |
| 6,618,484 B1 | 9/2003 | Van Wie et al. |
| 6,625,297 B1 | 9/2003 | Bradley |
| 6,628,729 B1 | 9/2003 | Sorensen |
| 6,633,653 B1 | 10/2003 | Hobson et al. |
| 6,636,615 B1 | 10/2003 | Rhoads et al. |
| 6,636,967 B1 | 10/2003 | Koyano |
| 6,647,128 B1 | 11/2003 | Rhoads |
| 6,647,129 B2 | 11/2003 | Rhoads |
| 6,654,501 B1 | 11/2003 | Acharya et al. |
| 6,661,905 B1 | 12/2003 | Chupp et al. |
| 6,665,419 B1 | 12/2003 | Oami |
| 6,668,068 B2 | 12/2003 | Hashimoto |
| 6,671,376 B1 | 12/2003 | Koto et al. |
| 6,671,388 B1 | 12/2003 | Op De Beeck et al. |
| 6,674,861 B1 | 1/2004 | Xu et al. |
| 6,674,876 B1 | 1/2004 | Hannigan et al. |
| 6,675,146 B2 | 1/2004 | Rhoads |
| 6,678,389 B1 | 1/2004 | Sun et al. |
| 6,681,029 B1 | 1/2004 | Rhoads |
| 6,683,958 B2 | 1/2004 | Petrovic |
| 6,697,944 B1 | 2/2004 | Jones et al. |
| 6,700,990 B1 | 3/2004 | Rhoads |
| 6,704,431 B1 | 3/2004 | Ogawa et al. |
| 6,707,926 B1 | 3/2004 | Macy et al. |
| 6,721,439 B1 | 4/2004 | Levy et al. |
| 6,728,390 B2 | 4/2004 | Rhoads et al. |
| 6,737,957 B1 | 5/2004 | Petrovic et al. |
| 6,738,495 B2 | 5/2004 | Rhoads et al. |
| 6,744,906 B2 | 6/2004 | Rhoads et al. |
| 6,748,360 B2 | 6/2004 | Pitman et al. |
| 6,751,337 B2 | 6/2004 | Tewfik et al. |
| 6,757,908 B1 | 6/2004 | Vogel |
| 6,768,807 B1 | 7/2004 | Muratani |
| 6,771,797 B2 | 8/2004 | Ahmed |
| 6,785,399 B2 | 8/2004 | Fujihara |
| 6,785,401 B2 | 8/2004 | Walker et al. |
| 6,785,815 B1 | 8/2004 | Serret-Avila et al. |
| 6,792,542 B1 | 9/2004 | Lee et al. |
| 6,798,893 B1 | 9/2004 | Tanaka |
| 6,801,999 B1 | 10/2004 | Venkatesan et al. |
| 6,823,455 B1 | 11/2004 | Macy et al. |
| 6,829,368 B2 | 12/2004 | Meyer et al. |
| 6,829,582 B1 | 12/2004 | Barsness |
| 6,834,344 B1 | 12/2004 | Aggarwal et al. |
| 6,834,345 B2 | 12/2004 | Bloom et al. |
| 6,850,555 B1 | 2/2005 | Barclay |
| 6,850,626 B2 | 2/2005 | Rhoads et al. |
| 6,856,693 B2 | 2/2005 | Miller |
| 6,871,180 B1 | 3/2005 | Neuhauser et al. |
| 6,880,082 B2 | 4/2005 | Ohta |
| 6,888,943 B1 | 5/2005 | Lam et al. |
| 6,891,958 B2 | 5/2005 | Kirovski et al. |
| 6,912,010 B2 | 6/2005 | Baker et al. |
| 6,912,294 B2 | 6/2005 | Wang et al. |
| 6,912,315 B1* | 6/2005 | Wong et al. .................. 382/232 |
| 6,915,002 B2 | 7/2005 | Gustafson |
| 6,915,422 B1 | 7/2005 | Nakamura |
| 6,915,481 B1 | 7/2005 | Tewfik et al. |
| 6,928,233 B1 | 8/2005 | Walker et al. |
| 6,931,536 B2 | 8/2005 | Hollar |
| 6,944,313 B1 | 9/2005 | Donescu |
| 6,944,771 B2 | 9/2005 | Epstein |
| 6,947,893 B1 | 9/2005 | Iwaki et al. |
| 6,952,774 B1 | 10/2005 | Kirovski et al. |
| 6,954,541 B2 | 10/2005 | Fan et al. |
| 6,961,854 B2 | 11/2005 | Serret-Avila et al. |
| 6,973,195 B1 | 12/2005 | Matsui |
| 6,993,154 B2 | 1/2006 | Brunk |
| 6,996,249 B2 | 2/2006 | Miller et al. |
| 7,007,166 B1 | 2/2006 | Moskowitz et al. |
| 7,020,304 B2 | 3/2006 | Alattar et al. |
| 7,024,018 B2 | 4/2006 | Petrovic |
| 7,043,049 B2 | 5/2006 | Kuzma |
| 7,043,536 B1 | 5/2006 | Philyaw et al. |
| 7,043,638 B2 | 5/2006 | McGrath et al. |
| 7,046,808 B1 | 5/2006 | Metois et al. |
| 7,054,461 B2 | 5/2006 | Zeller et al. |
| 7,054,462 B2 | 5/2006 | Rhoads et al. |
| 7,058,809 B2 | 6/2006 | White et al. |
| 7,058,815 B2 | 6/2006 | Morin |
| 7,068,809 B2 | 6/2006 | Stach |

(56) References Cited

U.S. PATENT DOCUMENTS

| | | |
|---|---|---|
| 7,072,492 B2 | 7/2006 | Ogawa et al. |
| 7,103,678 B2 | 9/2006 | Asai et al. |
| 7,107,452 B2 | 9/2006 | Serret-Avila et al. |
| 7,111,169 B2 | 9/2006 | Ripley et al. |
| 7,113,613 B2 | 9/2006 | Echizen et al. |
| 7,142,691 B2 | 11/2006 | Levy |
| 7,162,642 B2 | 1/2007 | Schumann et al. |
| 7,164,778 B1 | 1/2007 | Nakamura et al. |
| 7,167,599 B1 | 1/2007 | Diehl |
| 7,171,020 B2 | 1/2007 | Rhoads et al. |
| 7,177,429 B2 | 2/2007 | Moskowitz et al. |
| 7,197,368 B2 | 3/2007 | Kirovski et al. |
| 7,206,649 B2 | 4/2007 | Kirovski et al. |
| 7,224,819 B2 | 5/2007 | Levy et al. |
| 7,231,061 B2 | 6/2007 | Bradley |
| 7,289,643 B2 | 10/2007 | Brunk et al. |
| 7,298,865 B2 | 11/2007 | Lubin et al. |
| 7,319,759 B1 | 1/2008 | Peinado et al. |
| 7,321,666 B2 | 1/2008 | Kunisa |
| 7,334,247 B1 | 2/2008 | Finseth et al. |
| 7,336,802 B2 | 2/2008 | Kunisa |
| 7,346,514 B2 | 3/2008 | Herre et al. |
| 7,369,677 B2 | 5/2008 | Petrovic et al. |
| 7,389,421 B2 | 6/2008 | Kirovski et al. |
| 7,430,670 B1 | 9/2008 | Horning et al. |
| 7,450,727 B2 | 11/2008 | Griesinger |
| 7,454,019 B2 | 11/2008 | Williams |
| 7,562,392 B1 | 7/2009 | Rhoads et al. |
| 7,581,103 B2 | 8/2009 | Home et al. |
| 7,587,601 B2 | 9/2009 | Levy et al. |
| 7,616,776 B2 | 11/2009 | Petrovic et al. |
| 7,617,509 B1 | 11/2009 | Brunheroto et al. |
| 7,630,497 B2 | 12/2009 | Lotspiech et al. |
| 7,644,282 B2 | 1/2010 | Petrovic et al. |
| 7,660,991 B2 | 2/2010 | Nakamura et al. |
| 7,664,332 B2 | 2/2010 | Wong et al. |
| 7,693,297 B2 | 4/2010 | Zhang et al. |
| 7,698,570 B2 | 4/2010 | Schumann et al. |
| 7,788,684 B2 | 8/2010 | Petrovic et al. |
| 7,788,693 B2 | 8/2010 | Robbins |
| 7,818,763 B2 | 10/2010 | Sie et al. |
| 7,840,006 B2 | 11/2010 | Ogawa et al. |
| 7,979,881 B1 | 7/2011 | Wong et al. |
| 7,983,922 B2 | 7/2011 | Neusinger et al. |
| 7,986,806 B2 | 7/2011 | Rhoads |
| 7,991,995 B2 | 8/2011 | Rabin et al. |
| 8,055,013 B2 | 11/2011 | Levy et al. |
| 8,059,815 B2 | 11/2011 | Lofgren et al. |
| 8,155,463 B2 | 4/2012 | Wong et al. |
| 8,189,861 B1 | 5/2012 | Rucklidge |
| 8,194,803 B2 | 6/2012 | Baum et al. |
| 8,249,992 B2 | 8/2012 | Harkness et al. |
| 8,346,532 B2 | 1/2013 | Chakra et al. |
| 8,467,717 B2 | 6/2013 | Croy et al. |
| 8,589,969 B2 | 11/2013 | Falcon |
| 2001/0001159 A1 | 5/2001 | Ford |
| 2001/0021926 A1 | 9/2001 | Schneck et al. |
| 2001/0022786 A1 | 9/2001 | King et al. |
| 2001/0044899 A1 | 11/2001 | Levy |
| 2001/0051996 A1 | 12/2001 | Cooper et al. |
| 2001/0054146 A1 | 12/2001 | Carro et al. |
| 2002/0007403 A1 | 1/2002 | Echizen et al. |
| 2002/0012443 A1 | 1/2002 | Rhoads et al. |
| 2002/0033844 A1 | 3/2002 | Levy et al. |
| 2002/0044659 A1 | 4/2002 | Ohta |
| 2002/0052885 A1 | 5/2002 | Levy |
| 2002/0053026 A1 | 5/2002 | Hashimoto |
| 2002/0054089 A1 | 5/2002 | Nicholas et al. |
| 2002/0068987 A1 | 6/2002 | Hars |
| 2002/0080964 A1 | 6/2002 | Stone et al. |
| 2002/0080976 A1 | 6/2002 | Schreer |
| 2002/0082731 A1 | 6/2002 | Pitman et al. |
| 2002/0095577 A1 | 7/2002 | Nakamura et al. |
| 2002/0097873 A1 | 7/2002 | Petrovic |
| 2002/0120849 A1 | 8/2002 | McKinley et al. |
| 2002/0120854 A1 | 8/2002 | LeVine et al. |
| 2002/0126842 A1 | 9/2002 | Hollar |
| 2002/0126872 A1 | 9/2002 | Brunk et al. |
| 2002/0138734 A1 | 9/2002 | David et al. |
| 2002/0154144 A1 | 10/2002 | Lofgren et al. |
| 2002/0168087 A1 | 11/2002 | Petrovic |
| 2002/0178368 A1 | 11/2002 | Yin et al. |
| 2002/0199106 A1 | 12/2002 | Hayashi |
| 2003/0009671 A1 | 1/2003 | Yacobi et al. |
| 2003/0012098 A1 | 1/2003 | Sako et al. |
| 2003/0012403 A1 | 1/2003 | Rhoads et al. |
| 2003/0016825 A1 | 1/2003 | Jones |
| 2003/0021439 A1 | 1/2003 | Lubin et al. |
| 2003/0021441 A1 | 1/2003 | Levy et al. |
| 2003/0028796 A1 | 2/2003 | Roberts et al. |
| 2003/0031317 A1 | 2/2003 | Epstein |
| 2003/0033321 A1 | 2/2003 | Schrempp et al. |
| 2003/0037075 A1 | 2/2003 | Hannigan et al. |
| 2003/0053655 A1 | 3/2003 | Barone et al. |
| 2003/0056213 A1 | 3/2003 | McFaddin et al. |
| 2003/0061489 A1 | 3/2003 | Pelly et al. |
| 2003/0063747 A1 | 4/2003 | Petrovic |
| 2003/0072468 A1 | 4/2003 | Brunk et al. |
| 2003/0076955 A1 | 4/2003 | Alve et al. |
| 2003/0078891 A1 | 4/2003 | Capitant |
| 2003/0081809 A1 | 5/2003 | Fridrich et al. |
| 2003/0112974 A1 | 6/2003 | Levy |
| 2003/0112997 A1 | 6/2003 | Ahmed |
| 2003/0115504 A1 | 6/2003 | Holliman et al. |
| 2003/0131350 A1 | 7/2003 | Peiffer et al. |
| 2003/0152225 A1 | 8/2003 | Kunisa |
| 2003/0174862 A1 | 9/2003 | Rhoads et al. |
| 2003/0177359 A1 | 9/2003 | Bradley |
| 2003/0179901 A1 | 9/2003 | Tian et al. |
| 2003/0185417 A1 | 10/2003 | Alattar et al. |
| 2003/0187679 A1 | 10/2003 | Odgers et al. |
| 2003/0188166 A1 | 10/2003 | Pelly et al. |
| 2003/0190054 A1 | 10/2003 | Troyansky et al. |
| 2003/0190055 A1 | 10/2003 | Kalker et al. |
| 2003/0200438 A1 | 10/2003 | Kirovski et al. |
| 2003/0223584 A1 | 12/2003 | Bradley et al. |
| 2004/0005076 A1 | 1/2004 | Hosaka et al. |
| 2004/0008864 A1 | 1/2004 | Watson et al. |
| 2004/0009763 A1 | 1/2004 | Stone et al. |
| 2004/0010692 A1 | 1/2004 | Watson |
| 2004/0015400 A1 | 1/2004 | Whymark |
| 2004/0025176 A1 | 2/2004 | Franklin et al. |
| 2004/0028255 A1 | 2/2004 | Miller |
| 2004/0042635 A1 | 3/2004 | Epstein et al. |
| 2004/0042636 A1 | 3/2004 | Oh |
| 2004/0073916 A1 | 4/2004 | Petrovic et al. |
| 2004/0078575 A1 | 4/2004 | Morten et al. |
| 2004/0088556 A1 | 5/2004 | Weirauch |
| 2004/0091111 A1 | 5/2004 | Levy et al. |
| 2004/0093202 A1 | 5/2004 | Fischer et al. |
| 2004/0093523 A1 | 5/2004 | Matsuzaki et al. |
| 2004/0098593 A1 | 5/2004 | Muratani |
| 2004/0101160 A1 | 5/2004 | Kunisa |
| 2004/0103293 A1 | 5/2004 | Ryan |
| 2004/0111740 A1 | 6/2004 | Seok et al. |
| 2004/0133794 A1 | 7/2004 | Kocher et al. |
| 2004/0136531 A1 | 7/2004 | Asano et al. |
| 2004/0151316 A1 | 8/2004 | Petrovic |
| 2004/0169581 A1 | 9/2004 | Petrovic et al. |
| 2004/0174996 A1 | 9/2004 | Tewfik et al. |
| 2004/0202324 A1 | 10/2004 | Yamaguchi et al. |
| 2004/0204943 A1 | 10/2004 | Kirovski et al. |
| 2004/0216157 A1 | 10/2004 | Shain et al. |
| 2004/0250078 A1 | 12/2004 | Stach et al. |
| 2004/0258274 A1 | 12/2004 | Brundage et al. |
| 2005/0008190 A1 | 1/2005 | Levy et al. |
| 2005/0010779 A1 | 1/2005 | Kobayashi et al. |
| 2005/0013462 A1 | 1/2005 | Rhoads |
| 2005/0050332 A1 | 3/2005 | Serret-Avila et al. |
| 2005/0071669 A1 | 3/2005 | Medvinsky et al. |
| 2005/0120220 A1 | 6/2005 | Oostveen et al. |
| 2005/0144632 A1 | 6/2005 | Mears et al. |
| 2005/0154891 A1 | 7/2005 | Skipper |
| 2005/0196051 A1 | 9/2005 | Wong et al. |

(56) References Cited

U.S. PATENT DOCUMENTS

| | | |
|---|---|---|
| 2005/0202781 A1 | 9/2005 | Steelberg et al. |
| 2005/0242568 A1 | 11/2005 | Long et al. |
| 2005/0251683 A1 | 11/2005 | Levy et al. |
| 2006/0005029 A1 | 1/2006 | Petrovic et al. |
| 2006/0056653 A1 | 3/2006 | Kunisa |
| 2006/0062426 A1 | 3/2006 | Levy et al. |
| 2006/0075424 A1 | 4/2006 | Talstra et al. |
| 2006/0104477 A1 | 5/2006 | Isogai et al. |
| 2006/0143018 A1* | 6/2006 | Densham et al. ............ 704/500 |
| 2006/0227968 A1 | 10/2006 | Chen et al. |
| 2006/0239501 A1 | 10/2006 | Petrovic et al. |
| 2007/0003103 A1 | 1/2007 | Lemma et al. |
| 2007/0005500 A1 | 1/2007 | Steeves et al. |
| 2007/0033146 A1 | 2/2007 | Hollar |
| 2007/0039018 A1 | 2/2007 | Saslow et al. |
| 2007/0100483 A1 | 5/2007 | Kentish et al. |
| 2007/0143617 A1 | 6/2007 | Farber et al. |
| 2007/0150418 A1 | 6/2007 | Ben-Menahem et al. |
| 2007/0168673 A1 | 7/2007 | Van Der Veen et al. |
| 2007/0177761 A1 | 8/2007 | Levy |
| 2007/0192261 A1 | 8/2007 | Kelkar et al. |
| 2007/0208711 A1 | 9/2007 | Rhoads et al. |
| 2007/0214049 A1 | 9/2007 | Postrel |
| 2007/0223708 A1 | 9/2007 | Villemoes et al. |
| 2008/0002854 A1 | 1/2008 | Tehranchi et al. |
| 2008/0016360 A1 | 1/2008 | Rodriguez et al. |
| 2008/0031463 A1 | 2/2008 | Davis |
| 2008/0209219 A1 | 8/2008 | Rhein |
| 2008/0228733 A1 | 9/2008 | Davis et al. |
| 2008/0273861 A1 | 11/2008 | Yang et al. |
| 2008/0298632 A1 | 12/2008 | Reed |
| 2008/0310629 A1 | 12/2008 | Van Der Veen et al. |
| 2008/0310673 A1 | 12/2008 | Petrovic et al. |
| 2008/0313741 A1 | 12/2008 | Alve et al. |
| 2009/0031134 A1 | 1/2009 | Levy |
| 2009/0033617 A1 | 2/2009 | Lindberg et al. |
| 2009/0158318 A1 | 6/2009 | Levy |
| 2009/0172405 A1 | 7/2009 | Shiomi et al. |
| 2009/0175594 A1 | 7/2009 | Ann et al. |
| 2009/0177674 A1 | 7/2009 | Yoshida |
| 2009/0262932 A1 | 10/2009 | Petrovic |
| 2009/0319639 A1 | 12/2009 | Gao et al. |
| 2009/0326961 A1 | 12/2009 | Petrovic et al. |
| 2010/0034513 A1 | 2/2010 | Nakano et al. |
| 2010/0115267 A1 | 5/2010 | Guo et al. |
| 2010/0121608 A1 | 5/2010 | Tian et al. |
| 2010/0146286 A1 | 6/2010 | Petrovic et al. |
| 2010/0159425 A1 | 6/2010 | Hamlin |
| 2010/0162352 A1 | 6/2010 | Haga et al. |
| 2010/0214307 A1 | 8/2010 | Lee et al. |
| 2010/0226525 A1 | 9/2010 | Levy et al. |
| 2010/0228632 A1 | 9/2010 | Rodriguez |
| 2010/0228857 A1 | 9/2010 | Petrovic et al. |
| 2010/0287579 A1 | 11/2010 | Petrovic et al. |
| 2010/0287609 A1 | 11/2010 | Gonzalez et al. |
| 2011/0016172 A1 | 1/2011 | Shah |
| 2011/0068898 A1 | 3/2011 | Petrovic et al. |
| 2011/0091066 A1 | 4/2011 | Alattar |
| 2011/0103444 A1 | 5/2011 | Baum et al. |
| 2011/0123063 A1 | 5/2011 | Delp et al. |
| 2011/0173210 A1 | 7/2011 | Ahn et al. |
| 2011/0202687 A1 | 8/2011 | Glitsch et al. |
| 2011/0209191 A1 | 8/2011 | Shah |
| 2011/0219229 A1 | 9/2011 | Cholas et al. |
| 2011/0225427 A1 | 9/2011 | Wood et al. |
| 2011/0235908 A1 | 9/2011 | Ke et al. |
| 2011/0286625 A1 | 11/2011 | Petrovic et al. |
| 2011/0293090 A1 | 12/2011 | Ayaki et al. |
| 2011/0311056 A1 | 12/2011 | Winograd |
| 2011/0320627 A1 | 12/2011 | Landow et al. |
| 2012/0017091 A1 | 1/2012 | Petrovic et al. |
| 2012/0026393 A1 | 2/2012 | Petrovic et al. |
| 2012/0072729 A1 | 3/2012 | Winograd et al. |
| 2012/0072730 A1 | 3/2012 | Winograd et al. |
| 2012/0072731 A1 | 3/2012 | Winograd et al. |
| 2012/0084870 A1 | 4/2012 | Petrovic |
| 2012/0130719 A1 | 5/2012 | Petrovic et al. |
| 2012/0203556 A1 | 8/2012 | Villette et al. |
| 2012/0265735 A1 | 10/2012 | McMillan et al. |
| 2012/0300977 A1 | 11/2012 | Petrovic et al. |
| 2013/0007462 A1 | 1/2013 | Petrovic et al. |
| 2013/0011006 A1 | 1/2013 | Petrovic et al. |
| 2013/0031579 A1 | 1/2013 | Klappert |
| 2013/0073065 A1 | 3/2013 | Chen et al. |
| 2013/0108101 A1 | 5/2013 | Petrovic et al. |
| 2013/0114847 A1 | 5/2013 | Petrovic et al. |
| 2013/0114848 A1 | 5/2013 | Petrovic et al. |
| 2013/0117570 A1 | 5/2013 | Petrovic et al. |
| 2013/0117571 A1 | 5/2013 | Petrovic et al. |
| 2013/0129303 A1 | 5/2013 | Lee et al. |
| 2013/0132727 A1 | 5/2013 | Petrovic |
| 2013/0142382 A1 | 6/2013 | Petrovic et al. |
| 2013/0151855 A1 | 6/2013 | Petrovic et al. |
| 2013/0151856 A1 | 6/2013 | Petrovic et al. |
| 2013/0152210 A1 | 6/2013 | Petrovic et al. |
| 2013/0283402 A1 | 10/2013 | Petrovic |
| 2013/0339029 A1 | 12/2013 | Petrovic et al. |

FOREIGN PATENT DOCUMENTS

| | | |
|---|---|---|
| EP | 372601 A1 | 6/1990 |
| EP | 581317 A2 | 2/1994 |
| EP | 2166725 | 3/2010 |
| GB | 2260246 A | 4/1993 |
| GB | 2292506 A | 2/1996 |
| GB | 2363027 A | 12/2001 |
| JP | 10-150548 A | 6/1998 |
| JP | 11-086435 A | 3/1999 |
| JP | 11-284516 A | 10/1999 |
| JP | 11284516 | 10/1999 |
| JP | 11-346302 A | 12/1999 |
| JP | 11346302 | 12/1999 |
| JP | 2000-069273 A | 3/2000 |
| JP | 2000-174628 A | 6/2000 |
| JP | 2000163870 | 6/2000 |
| JP | 2000174628 | 6/2000 |
| JP | 2001022366 | 1/2001 |
| JP | 2001-119555 A | 4/2001 |
| JP | 2001-188549 A | 7/2001 |
| JP | 2001-216763 A | 8/2001 |
| JP | 2001-218006 A | 8/2001 |
| JP | 2001245132 | 9/2001 |
| JP | 2001-312570 A | 11/2001 |
| JP | 2001-527660 A | 12/2001 |
| JP | 2002-010057 A | 1/2002 |
| JP | 2002-024095 A | 1/2002 |
| JP | 2002-027223 A | 1/2002 |
| JP | 2002027223 | 1/2002 |
| JP | 2002-091465 A | 3/2002 |
| JP | 2002091712 | 3/2002 |
| JP | 2002100116 | 4/2002 |
| JP | 2002125205 | 4/2002 |
| JP | 2002135557 | 5/2002 |
| JP | 2002-165191 A | 6/2002 |
| JP | 2002176614 | 6/2002 |
| JP | 2002-519916 A | 7/2002 |
| JP | 2002-232693 A | 8/2002 |
| JP | 2002319924 | 10/2002 |
| JP | 2002354232 | 12/2002 |
| JP | 2003-008873 A | 1/2003 |
| JP | 2003-039770 A | 2/2003 |
| JP | 2003-091927 A | 3/2003 |
| JP | 2003-230095 A | 8/2003 |
| JP | 2003-244419 A | 8/2003 |
| JP | 2003-283802 A | 10/2003 |
| JP | 2003316556 | 11/2003 |
| JP | 2004-023786 A | 1/2004 |
| JP | 2004023786 | 1/2004 |
| JP | 2004070606 | 3/2004 |
| JP | 2004-163855 A | 6/2004 |
| JP | 2004-193843 A | 7/2004 |
| JP | 2004194233 | 7/2004 |
| JP | 2004-328747 A | 11/2004 |
| JP | 2004328747 | 11/2004 |

(56) References Cited

FOREIGN PATENT DOCUMENTS

| | | |
|---|---|---|
| JP | 2005051733 | 2/2005 |
| JP | 2005-094107 A | 4/2005 |
| JP | 2005094107 | 4/2005 |
| JP | 2005525600 | 8/2005 |
| JP | 20080539669 | 11/2008 |
| JP | 20100272920 | 12/2010 |
| JP | 5283732 | 7/2013 |
| KR | 20100009384 | 1/2010 |
| WO | 94-10771 | 5/1994 |
| WO | 95-14289 | 5/1995 |
| WO | 97-09797 | 3/1997 |
| WO | 97-33391 | 9/1997 |
| WO | 98-53565 | 11/1998 |
| WO | 99-03340 | 1/1999 |
| WO | 99-39344 | 5/1999 |
| WO | 99-45706 | 10/1999 |
| WO | 99-62022 | 12/1999 |
| WO | 00-00969 | 1/2000 |
| WO | 00/13136 | 3/2000 |
| WO | 00/56059 | 9/2000 |
| WO | 01-54035 | 7/2001 |
| WO | 01-55889 | 8/2001 |
| WO | 0197128 | 12/2001 |
| WO | WO 0197128 A1 * | 12/2001 |
| WO | 02-23883 | 3/2002 |
| WO | 0219589 | 3/2002 |
| WO | 03-052598 | 6/2003 |
| WO | 2005017827 | 2/2005 |
| WO | 2005-027501 | 3/2005 |
| WO | 2005027501 | 3/2005 |
| WO | 2005038778 | 4/2005 |
| WO | 2006051043 | 5/2006 |
| WO | 2006116394 | 11/2006 |
| WO | 2010073236 | 7/2010 |
| WO | 2013067439 | 5/2013 |
| WO | 2013090462 | 6/2013 |
| WO | 2013090466 | 6/2013 |
| WO | 2013090467 | 6/2013 |

OTHER PUBLICATIONS

Cinea Icc., "Forensic Watermarking", 2004. [http://www.cinea.com/whitepapers/forensic_watermarking.pdf] (9 pages).
RSA Laboratory, "Frequently Asked Questions About Today's Cryptography," Version 4.1, May 2000, pp. 1; 20-33; 54-58; 74-75; 87-88; 101-102; 106-110 and 113-118.
Jacobsmeyer, Jay, "Introduction to Error-Control Coding," Pericle Communications Company, 2004 (16 pages).
Schneier, Bruce. "Applied Cryptography: Protocols, Algorithms, and Source Code in C", Second Edition, Wiley & Sons, 1995; pp. 189-211.
Lelewer, D.A. and Hirschberg, D.S., "Data Compression," ACM Computing Surveys (CSUR), vol. 1, Issue 3, Sep. 1987, (59 pages).
Lu, Chun-Shien et al., "Oblivious Cocktail Watermarking by Sparse Code Shrinkage: A Regional- and Global-Based Scheme", ICIP, 2000 (vol. III: 13-16).
Mason, A., et al., "User Requirements for Watermarking in Broadcast Applications", IEEE Conference Publication, International Broadcasting Convention (IBC 2000), Amsterdam, Sep. 8-12, 2000 (7 pages).
"Microsoft Response to CfP for Technology Solutions to Screen Digital Audio Content for LCM Acceptance," Microsoft Corp., May 23, 1999.
Mintzer, et al., "An Invisible Watermarking Technique for Image Verification," 1997, pp. 680-683.
Mintzer et al., "If one watermak is good, are more better?", Acoustics, Speech, and Signal Processing, 1999. ICASSP'99., Publication Date Mar. 15-19, 1999, vol. 4, on pp. 2067-2069.
Mobasseri. B.G .. et al. "Content Authentication and Tamper Detection in Digital Video". Image Processing. 2000. Proceedings. 2000 International Conference. vol. 1.2000. p. 458-461.
Moulin, P., et al., "Detection-Theoretic Analysis of Desynchronization Attacks in Watermarking," Tech. Rep. MSR-TR-2002-24, Microsoft Research (Mar. 2002).
Muranoi, R., et al., "Video Retrieval Method using ShotID for Copyright Protection Systems," Proc. SPIE vol. 3527: Multimedia Storage and Archiving Systems III, Nov. 1998, pp. 245-252.
Nikolaidis et al., Watermark Detection: Benchmarking Perspectives, 2002 IEEE Conference on Multimedia and Expo (ICME 2002).
Office action dated Jul. 21, 2011 in Japanese Application 2008-508985.
Office Action dated Mar. 18, 2011 in European Application 03774648.4.
Park et al, "Robust and Fragile Watermarking Techniques for Documents Using Bidirectional Diagonal Profiles", Information and Communications Security: Third International Conference, ICICS 2001, Xian, China, Nov. 13-16, 2001, pp. 483-494.
Perez-Gonzalez, et al., "Approaching the capacity limit in image watermarking a perspective on coding techniques for data hiding applications", Signal Processing, vol. 81, No. 6, Jun. 2001, pp. 1215-1238 (24).
Petitcolas, F. A. P.., et al., "Attacks on Copyright Marking Systems" Second Workshop on Informa tion Hiding, vol. 1525 of Lecture Notes in Computer Science, pp. 218-238, Apr. 1998.
Philips Research Liquid Audio Fraunhofer Institute, "Digital Audio Screening Technology for Phased Rollout," v. 1.0, May 23, 1999.
Pytlak, John P. "Anti-Piracy Coding," URL: http://www.tele.com/pipermail/tig/2003-November/003842.html; Nov. 13, 2003 (2 pages).
Shih et al., "Combinational, image watermarking in the spatial and frequency domains", Pattern Recognition Society 36 pp. 969-975 (2002).
Solanki et ai, "Robust Image-Adaptive Data Hiding: Modeling, Source Coding, and Channel Coding", 41st Allerton Conference on Communications, Control, and Computing, Oct. 2003.
Steinebach, M., et al., "StirMark Benchmark: Audio Watermarking Attacks", Int. Conference on Information Technology: Coding and Computing (ITCC 2001), Apr. 2-4, Las Vegas, Nevada, pp. 49-54, ISBN 0-7695-1062-0, 2001.
Tanaka, K. et al. "Secret transmission method of character data in motion picture communication", SPIE vol. 1605, Visual Communications and Image Processing '91, Visual Communication. pp. 646-649, 1991.
TASK AC122—Copy Protection for Distribution Services, Jul. 1, 1997, Http://acad.bg/WISE/english/rd/partners/acts/areal/ac122-t.html.
Tsai, et al., "Wavelet packet and adaptive spatial transformation of watermark for digital image authentication", IEEE, Image Processing, 2000, Proceedings. 2000 International Conference on, Publication Date: 2000, vol. 1, on pp. 450-453 vol. 1, abstract, p. 452, section 2, pp. 450-452, section 2.
Verance Corporation, "Confirmedia", PowerPoint presentation made to National Association of Broadcasters; Apr. 24, 2001 (40 pages).
Xu, C., et al., "Applications of digital watermarking technology in audio signals", J. Audio Eng. Soc., vol. 47, No. 10, pp. 805-812, Oct. 1999.
Yeung, et al., "An Invisible Watermarking Technique for Image Verification," 1997, pp. 680-683.
Zhao, J., "Applying Digital Watermarking Techniques to Online Multimedia Commerce," Proc. Int. Conf. on Imaging Science, Systems and Applications (CISSA'97), Jun./Jul. 1997, 7 pages.
Zhao, J., "A WWW Service to Embed and Prove Digital Copyright Watermarks," Proc. European Conf. on Multimedia Applications, Services and Techniques (ECMAST'96), May 1996, pp. 695-710.
Adelsbach, A., et al., "Proving Ownership of Digital Content," Proc. 3rd Int. Workshop on Information Hiding, LNCS vol. 1768, Sep./Oct. 1999, pp. 117,133.
Advanced Access Content System (AACS), Pre-recorded Video Book, Revision 0.951, Sep. 28, 2009, 88 pages total.
Aggarwal, et al., "Multi-Layer Grid Embeddings," IEEE, 1985, pp. 186-196.
"Audio Watermarking System to Screen Digital Audio Content for LCM Acceptance," Aris Technologies, Inc., May 23, 1999.

(56) References Cited

OTHER PUBLICATIONS

Barreto, et al. "Toward Secure Public-Key Blockwise Fragile Authentication Watermarking", IEEE Proceedings—Vision, Image, and Signal Processing—Apr. 2002, vol. 149, Issue 2, p. 57-62.
Boney, L., et al., "Digital Watermarks for Audio Signals," Dept. of Electrical Engineering, Univ. of Minnesota, Mar. 27, 1996.
Caronni, Germano,"Assuring Ownership Rights for Digital Images", Proceedings of 'reliable IT systems' VIS 95, H.H. Bruggermann and W. Gerhardt-Hackl (Ed.), Vieweg Publishing Company, Germany, 1995.
Chen, B. and G.W. Wornell, "Quantization index modulation: a class of provably good methods for digital watermarking and information embedding," IEEE Transactions on Information Theory, vol. 47, No. 4, pp. 1423-1443, 2001.
Chou, J. et al., "A Robust Optimization Solution to the Data Hiding Problem using Distributed Source Coding Principles", Pro. SPIE, vol. 3971, San Jose, CA (Jan. 2000) (10 pages).
Chou, J., et al., "A Robust Blind Watermarking Scheme based on Distributed Source Coding Principles", ACM Multimedia 2000 Los Angeles, CA USA.
International Search Report for PCT Application No. PCT/US98/09587 dated Aug. 14, 1998.
International Search Report for PCT Application No. PCT/US01/26505 dated Feb. 14, 2002.
International Search Report for PCT Application No. PCT/US03/31816 dated May 19, 2004.
International Search Report for PCT Application No. PCT/US06/31267 dated Aug. 22, 2007.
International Search Report for PCT/US2006/015615 dated Jan. 4, 2008.
International Search Report for PCT Application No. PCT/US06/25090 dated May 13, 2008.
International Search Report for PCT Application No. PCT/US06/15410 dated May 29, 2008.
International Search Report for PCT Application No. PCT/US07/16812 dated Sep. 26, 2008.
M. Costa, "Writing on Dirty Paper" IEEE Trans. on Info. Theory, IT-29, No. 3, pp. 439-441 (May 1983) (3 pages).
Cox, I. J. and J. P. M. G. Linnartz, "Some General Methods for Tampering with Watermarks" IEEE Journal on Selected Areas in Communications, vol. 16, No. 4, May 1998, pp. 587-593.
Coxford, A., et al., "Advanced Mathematics: A Preparation for Calculus, Second Edition," 1978, pp. 35-46.
Davidson, M.F., "Music File Filter," Sony Music, New York, May 23, 1999.
Das, et al., "Distributed Priority Queues on Hybercube Architectures," IEEE, 1996, pp. 620-627.
Digimarc® Watermarking Guide, © 1999 Digimarc Corporation, 22 pages.
Dittmann, J., "Combining digital watermarks and collusion secure fingerprints for digital images," Proc. SPIE vol. 3657: Security and Watermarking of Multimedia Contents, Jan. 1999, pp. 171-182.
Dittmann, J., "Combining digital watermarks and collusion secure fingerprints for customer copy monitoring", Proc. IEEE Seminar on Secure Images and Image Authentication, Apr. 2000, pp. 6/1-6/6.
European Search Report for European Application No. 03774648.4 dated Nov. 10, 2010.
Furon, T. and P. Duhamel, "An asymmetric watermarking method", IEEE Trans. Signal Processing, vol. 51, No. 4, Apr. 2003, pp. 981-995.
Guth, H.J. et al., "Error- and Collusion-Secure Fingerprinting for Digital Data," Proc. 3rd Int. Workshop on Information Hiding, LNCS vol. 1768, Sep./Oct. 1999, pp. 134-145.
Hartung, F., et al., "Watermarking of MPEG-2 encoded video without decoding and re-coding," Proc. SPIE vol. 3020: Multimedia Computing and Networking 97, Feb. 1997, pp. 264-274.
Hartung, F., et al., "Digital Watermarking of MPEG-2 Coded Video in the Bitstream Domain," Proc. IEEE Int. Conf. on Acoustics, Speech and Signal Processing, Apr. 1997, pp. 2621-2624.

Hartung, F., et al., "Watermarking of uncompressed and compressed video," Signal Processing, vol. 66, May 1998, pp. 283-301.
Heegard, C. et al., "On the Capacity of Computer Memory with Defects", IEEE Trans. Info. Theory, vol. IT-29, No. 5, pp. 731-739 (Sep. 1983) (9 pages).
http://www.cryptography.com/technology/spdc/index.html.
Kalker, T., "A security risk for publicly available watermark detectors", Proc. Benelux Info. Theory Symp., Veldhoven, The Netherlands, May 1998.
Kalker T., "System Issues in Digital Image and Video Watermarking for Copy Protection," Proc. IEEE Int. Conf. on Multimedia Computing and Systems, Jun. 1999, pp. 562-567.
Kang et al, "A DWT-DFT Composite Watermarking Scheme Robust to 80th Affine Transform and JPEG Compression", IEEE Transactions on Circuits and Systems for Video Technology, vol. 13, No. 8, Aug. 2003.
Kim, T.Y., et al. "An Asymmetric Watermarking System With Many Embedding Watermarks Corresponding to One Detection Watermark", IEEE signal processing letters, vol. 11, No. 3, Mar. 2004.
Kirovski et al., "Multimedia Content Screening using a Dual Watermarking and Fingerprinting System", Proceedings of the tenth ACM international conference, pp. 372-381, 2002.
D. Kirovski and F.A.P. Petitcolas, "The blind pattern matching attack on watermark systems," IEEE Trans. Signal Processing, Apr. 2003.
Kirovski et al., "Randomizing the replacement attack", ICASSP, 2004, pp. 381-384.
Kirovski, et al., "Multimedia Content Screening using a Dual Watermarking and Fingerprinting System", Tech. Rep. MSR-TR-2001-57, Microsoft Research Jun. 2001).
Kocher, P. et al., "Self-Protecting Digital Content: A Technical Report from the CRI Content Security Research Initiative," Cryptography Research, Inc. (CRI), 2002-2003 pp. 1-14.
Kutter, et al., "The watermark copy attack", Proc. of the SPIE: Security and Watermarking of Multimedia Content II, vol. 3971, Jan. 2000.
Kuznetsov, A.V. et al., An Error Correcting Scheme for Defective Memory, IEEE Trans. Inf. Theory, vol. 4, No. 6, pp. 712-718 (Nov. 1978) (7 pages).
Lacy, C., et al., "Intellectual Property Protection Systems and Digital Watermarking," Proceedings: Information Hiding, Second International Workshop, Portland, OR, pp. 158-168, 1998.
Lin et al., "Detection of image alterations using semi-fragile watermarks", Proceedings of the SPIE International Conference on Security and Watermarking of Multimedia Contents II, vol. 3971, USA, Jan. 2000 (12 pages).
Lin, P.L., "Robust transparent image watermarking system with spatial mechanisms," The Journal of Systems and Software, vol. 50, Feb. 2000, pp. 107-116.
Lotspeich, J., "The Advanced Access Content System's Use of Digital Watermarking," MCPS '06, Oct. 28, 2006, pp. 19-21.
"Advanced Access Content System (AACS), Pre-recorded Video Book," Revision 0.951, Sep. 2009 (86 pages).
"Civolution's 2nd screen synchronisation solution wins CSI product of the year 2011 award at IBC," IBC Press Release, Hall 2—Stand C30, Sep. 2011 (2 pages).
"Content Protection—Self Protecting Digital Content," http://www.cryptography.com/technology/spdc/index.html, May 2010 (1 page).
"Red Bee and Civolution develop companion app for FX UK," http://www.digitaltveurope.net/19981/red-bee-and-civolution-develop-companion-app-for-fx-uk, Jan. 2012 (2 pages).
Bangaleea, R., et al., "Performance improvement of spread spectrum spatial-domain watermarking scheme through diversity and attack characterisation," IEEE Africon, pp. 293-298, 2002.
Cappellini, V., et al. "Robust Frame-based Watermarking for Digital Video," Proceedings of the 12th International Workshop on Database and Expert Systems Applications, Sep. 2001 (5 pages).
European Search Report dated Apr. 12, 2012 for European Patent Application No. 07836262.1 filed Jul. 25, 2007 (12 pages).
European Search Report dated Jul. 3, 2012 for European Patent Application No. 12150742.0, filed Oct. 7, 2003 (5 pages).
European Search Report dated Oct. 24, 2012 for European Patent Application No. 06758537.2, filed Apr. 21, 2006 (6 pages).

(56) References Cited

OTHER PUBLICATIONS

European Search Report dated Oct. 31, 2012 for European Patent Application No. 06758577.8, filed Apr. 25, 2006 (6 pages).
European Search Report dated Nov. 8, 2012 for European Patent Application No. 06785709.4, filed Jun. 27, 2006 (5 pages).
International Search Report and Written Opinion dated Apr. 8, 2013 for International Application No. PCT/US2012/069306, filed Dec. 12, 2012 (12 pages).
International Search Report and Written Opinion dated Mar. 25, 2013 for International Application No. PCT/US2012/069302, filed Dec. 12, 2012 (22 pages).
International Search Report and Written Opinion dated Apr. 24, 2012 for International Application No. PCT/US2011/051857, filed Sep. 15, 2011 (9 pages).
International Search Report and Written Opinion dated Feb. 28, 2013 for International Application No. PCT/US2012/066138, filed Nov. 20, 2012 (11 pages).
International Search Report and Written Opinion dated Mar. 14, 2013 for International Application No. PCT/US2012/069308, filed Dec. 12, 2012 (10 pages).
International Search Report and Written Opinion dated Mar. 28, 2012 for International Application No. PCT/US2011/051855, filed Sep. 15, 2011 (8 pages).
International Search Report and Written Opinion dated Mar. 18, 2013 for International Application No. PCT/US2012/063431, filed Nov. 2, 2012 (10 pages).
Kirovski, D., et al., "Robust spread-spectrum audio watermarking," IEEE International Conference on Acoustics, Speech, and Signal Processing, 3:1345-1348, 2001.
Maehara, F., et al., "A proposal of multimedial home education terminal system based on flash-squeak OS," Technical report of the institute of image information and television engineers, 28(43):21-24, Jul. 2004.
Office Action dated Jul. 21, 2011 for Japanese Patent Application No. 2008-508985 (6 pages).
Office Action dated Mar. 16, 2012 for Japanese Patent Application No. 2008-508985 (8 pages).
Office Action dated May 8, 2012 for Japanese Patent Application No. 2009-522802 (4 pages).
Office Action dated Nov. 26, 2012 for Japanese Patent Application No. 2011-114667 (8 pages).
Office Action dated May 1, 2013 for Japanese Patent Application No. 2011-114667 (6 pages).
Office Action dated Nov. 28, 2012 for Japanese Patent Application No. 2011-114666 (8 pages).
Seok, J., et al., "A novel audio watermarking algorithm for copyright protection of digital audio," ETRI Journal, 24(3):181-189, Jun. 2002.
Spangler, T., "Social Science," http://www.multichannel.com/content/social-science, Sep. 2011 (5 pages).
Wang, X., et al., "Robust correlation of encrypted attack traffic through stepping stones by manipulation of interpacket delays," Proceedings of the 10th ACM conference on computer communications security, Oct. 27-30, 2003, Washington D.C., USA.
Wolfgang, R., et al., "Perceptual watermarks for digital images and video," Proceedings of the IEEE, 87(7):1108-1126, Jul. 1999.

\* cited by examiner

Electronic Codebook (ECB) mode encryption

Counter (CTR) mode encryption

Output Feedback (OFB) mode encryption

WATERMARKING IN AN ENCRYPTED DOMAIN

This application claims priority from U.S. provisional application No. 60/697,515 filed on Jul. 7, 2005, which is incorporated herein and made a part hereof by reference for all purposes as if set forth herein in its entirety.

BACKGROUND OF THE INVENTION

Encryption techniques are often utilized to protect multimedia content signals during their storage or transport from one location to the next. The encrypted content may be securely broadcast over the air, through the Internet, over cable networks, over wireless networks, distributed via storage media, or disseminated through other means with little concern about piracy of the content. The level of security of the encrypted content depends on, among other things, the strength of the encryption algorithm and the encryption key management and safekeeping.

Before describing the details of the present invention it is beneficial to review some common encryption algorithms and techniques. More detailed descriptions may be found in, for example, "Applied Cryptography" by B. Schneier (John Wiley & Sons: New York, 1996; ISBN: 0-471-12845-7). One class of encryption algorithms, called Stream Ciphers, converts the unencrypted content into an encrypted ciphertext one bit at a time. In this case, the content (i.e., the plaintext) is treated as a stream of bits, $p_i$, that are XORed with a stream of encryption key bits, $k_i$, to produce the encrypted (i.e., ciphertext) bits, $c_i$. Equation (1) describes this process mathematically:

$$c_i = p_i \oplus k_i \quad \text{Equation (1)}$$

The encryption key bits, $k_i$, are typically generated independently using key stream generators known in the art. At the decryption end, the encrypted stream is XORed with an identical key stream to produce the original content. The decryption operation is mathematically represented by Equation (2).

$$p_i = (p_i \oplus k_i) \oplus k_i \quad \text{Equation (2)}$$

In another class of encryption algorithms, called Block Ciphers, the content is processed in blocks of fixed size. So for example, a digital content may first be parsed into blocks of 64 bits and then each 64-bit block may be encrypted according to the encryption algorithm. Some of the most widely used encryption algorithms such as DES and AES are block ciphers. Block ciphers may further operate in different modes. In particular, in Electronic Codebook (ECB) and Counter (CTR) modes of operation, each block is encrypted independently from other blocks in the content. In Cipher Block Chaining (CBC) mode, Output Feedback (OFB) mode and Cipher Feedback (CFB) mode, each encrypted block has a dependency on the neighboring ciphertext and/or plaintext blocks. Cryptographic algorithms may also be classified as symmetric or asymmetric algorithms. In symmetric algorithms the same key is used for encryption and decryption, whereas in asymmetric algorithms different keys, and possibly different algorithmic steps, are used for encryption and decryption of the content.

While access to an encrypted content may be limited to entities with proper authorization and decryption keys, once a content is decrypted, it may be readily copied and disseminated. This is particularly true for multimedia content that must inevitably be converted to audio and/or visual signals (e.g., analog format) in order to reach an audience. Watermarks are particularly well suited to plug this so-called 'analog hole'. Digital watermarking is typically referred to as the insertion of auxiliary information bits into a host signal without producing perceptible artifacts. Watermark bits embedded into a host signal are designed to be imperceptible, robust to common content transformations, and resistant to intentional attacks that are targeted to remove or alter the watermarks. The detection of watermarks as well as the extraction of information carried in the watermarks may be used to trigger a variety of actions and enable a myriad of applications. Some of these applications include copy control, broadcast monitoring, rights management, authentication and integrity verification, forensic tracking and covert communication. Numerous watermarking algorithms and applications are described in the prior art.

Due to the complimentary roles of digital watermarking and encryption in the safekeeping and management of content, both techniques are often used to protect and manage content of significant value such as audio, video, still images, text, programming data and other information in digital or analog formats. In an example workflow of content preparation and distribution, a content may be first embedded with digital watermarks; then it may optionally be compressed (to save storage space and/or transmission bandwidth) and finally, it may be encrypted prior to being transmitted or stored outside of a secure environment. Note, that in some applications, the insertion of watermarks may alternatively, or additionally, take place after the compression of the content but prior to the encryption. In some applications, however, it may be advantageous to insert digital watermarks directly into an encrypted data stream (without first decrypting the content). For example, in a forensic tracking application, a digital movie, after appropriate post production processing, may be encrypted at the movie studio or post production house, and sent out for distribution to movie theatres, to on-line retailers, or directly to the consumer. In such applications, it is often desired to insert forensic or transactional watermarks into the movie content to identify each entity or node in the distribution channel, including the purchasers of the content, the various distributors of the content, the presentation venue and the time/date/location of each presentation or purchase. Since a multiplicity of purchase/presentation requests may be received at any given time, it is also desired to insert the watermarks expeditiously and efficiently into the content without introducing significant delays in the processing and transmission of the requested content.

One way to achieve this goal would be to, at each desired node of the distribution channel, decrypt and possibly decompress the content, insert the appropriate watermarks and then re-compress and re-encrypt the embedded content. This procedure not only requires the knowledge of the encryption/decryption algorithms as well as the presence of encryption/decryption keys at each distribution node, but is also likely to introduce significant delays in the processing of the content. While it may be possible to securely communicate the encryption/decryption keys to theses nodes and produce a secure environment for the encryption/decryption to take place, this task would require additional system design, network security operations and key management protocols which may affect the operational cost and overall security of the distribution system.

It would be advantageous to provide methods, apparatus, and systems for digital watermarking that overcome various deficiencies of the prior art by providing the capability of watermark insertion into an encrypted content signal. In particular, it would be advantageous to provide methods, apparatus, and systems for the insertion of watermarks into an encrypted digital content that do not require the decryption and subsequent re-encryption of the digital content. It would also be advantageous to allow secure insertion of digital watermarks at any point in the transmission, storage or distribution of an encrypted digital content, without the need to decrypt (and further re-encrypt) the encrypted digital host content signal, and without requiring the knowledge of the encryption/decryption keys. It would be further advantageous if such embedded watermarks were adapted to persist throughout the content after it has undergone decryption. It would be still further advantageous to enable the insertion of digital watermarks into an encrypted host content that is in a compressed format and in such a way that the embedded watermarks persist throughout the content even after decryption and decompression of the host content signal. It would be advantageous if such techniques were applicable to a host content that has been encrypted using a variety of different encryption techniques, including stream ciphers, block cipher, symmetric and asymmetric encryption algorithms.

The methods, apparatus, and systems of the present invention provide the foregoing and other advantages.

SUMMARY OF THE INVENTION

The present invention provides methods, apparatus, and systems for the insertion of watermarks into an encrypted digital content that do not require decryption and subsequent re-encryption of the content.

In one example embodiment of the present invention, a method for embedding auxiliary information symbols in an encrypted host content signal is provided. A first version of a host content signal embedded with a first logical value is encrypted to produce a first encrypted signal. A second version of the host content signal embedded with a second logical value is encrypted to produce a second encrypted signal. A first set of segments from the first encrypted signal is combined with a second set of segments from the second encrypted signal in a pre-defined manner to produce a composite encrypted host content with embedded auxiliary information.

The first and second encrypted signals may be in a compressed format. In particular, the two versions of the host content signals embedded with respective first and second logical values may be in a compressed format prior to encryption. Alternatively, they may be compressed after encryption and before transmission to a client device or user location.

The combining of the segments from the encrypted signals may be performed without the use of the encryption or decryption keys.

The embedded auxiliary information may persist throughout the host content after decryption of the composite encrypted host content.

The encrypting of the first and second versions of the host content signal may occur at a pre-processing center and the combining may occur at a user location.

A further example embodiment of the present invention provides a method for embedding auxiliary information symbols in an encrypted host content signal. A first version of an original host content signal embedded with a first logical value is encrypted to produce a first encrypted signal. A second signal comprising information corresponding to the first logical value and a second logical value embedded in the host content signal is produced. A first set of segments from the first encrypted signal is combined with a second set of segments from the second signal in a pre-defined manner to produce a composite encrypted host content with embedded auxiliary information.

The method may further include at least one of compressing, encrypting, and scrambling the second signal.

The host content signal may be in a compressed format. For example, the encrypting may comprise encrypting of the compressed host content signal embedded with a first logical value. Further, the second signal may comprise information corresponding to the first and second logical values embedded in the compressed host content signal.

A further example embodiment of a method for embedding auxiliary information symbols in an encrypted host content signal in accordance with the present invention is provided. The host content signal is encrypted to produce an unmarked encrypted host content signal. A first signal is produced which comprises information corresponding to a first logical value embedded in the host content signal. A second signal is produced comprising information corresponding to a second logical value embedded in the host content signal. A first set of segments is selected from the first signal and a second set of segments are selected from the second signal. The first set and the second set of segments are combined with the unmarked encrypted host content in a predefined manner to produce a composite encrypted host content with embedded auxiliary information.

The method may further include at least one of compressing, encrypting, and scrambling the first or second signal.

The host content signal may be in compressed format. In such an embodiment, the encrypting may comprise encrypting of the compressed host content signal. Similarly, the first and second signals may comprise information corresponding to first and second logical values embedded in the compressed host content signal, respectively.

The first and second signals may be transmitted to a user premises, and combined with the unmarked encrypted host content signal that resides at the user premises.

In a further example embodiment of the present invention, a method for embedding auxiliary information symbols in a compressed and encrypted host content signal is provided. A first version of a compressed host content signal embedded with a first logical value is encrypted to produce a first encrypted signal. A second signal is produced which comprises information corresponding to the first logical value and a second logical value embedded in the compressed host content signal. A first set of segments from the first encrypted signal is combined with a second set of segments from the second signal in a pre-defined manner to produce a composite encrypted host content with embedded auxiliary information.

The first encrypted signal and the second signal may comprise a matching signal interval. The combining may occur within the matching signal interval.

The first encrypted signal may comprise a partially encrypted signal.

Additional meta data corresponding to the first encrypted signal and the second signal are produced to facilitate the combining of the segments.

An example embodiment of the present invention also includes a further method for embedding auxiliary information into an encrypted host signal. In this embodiment, a first signal comprising an encrypted first version of a host signal is received, for example at a client device or user location. A second signal comprising information related to a first and a second logical values embedded in a second version of the host signal is also received. At least portions of the second signal are then combined with the first signal in a pre-defined manner to produce a composite encrypted host signal with embedded auxiliary information.

An additional method for embedding auxiliary information into an encrypted host signal in accordance with an example embodiment the present invention is also provided. In this embodiment, an information signal corresponding to first and second logical values embedded into a first version of the host signal is received (e.g., at a client device or user location) from a pre-processing center. This information signal may then be combined with an encrypted second version of the host signal in a pre-defined manner to produce a composite encrypted host signal with embedded auxiliary information. This encrypted version of the host signal may already be present at the client device or user location, or received thereat simultaneously with the information signal.

In any of the foregoing example embodiments, the encrypted signal may be encrypted in accordance with at least one of a stream cipher, a block cipher, a symmetric encryption algorithm, an asymmetric encryption algorithm, or the like. Further, the pre-defined manner of the combining of the segments may identify an entity or a transaction. In addition, the host content signal may comprise at least one of audio, video, text, and programming information.

BRIEF DESCRIPTION OF THE DRAWINGS

The present invention will hereinafter be described in conjunction with the appended drawing figures, wherein like reference numerals denote like elements, and.

DETAILED DESCRIPTION

Figure 1:
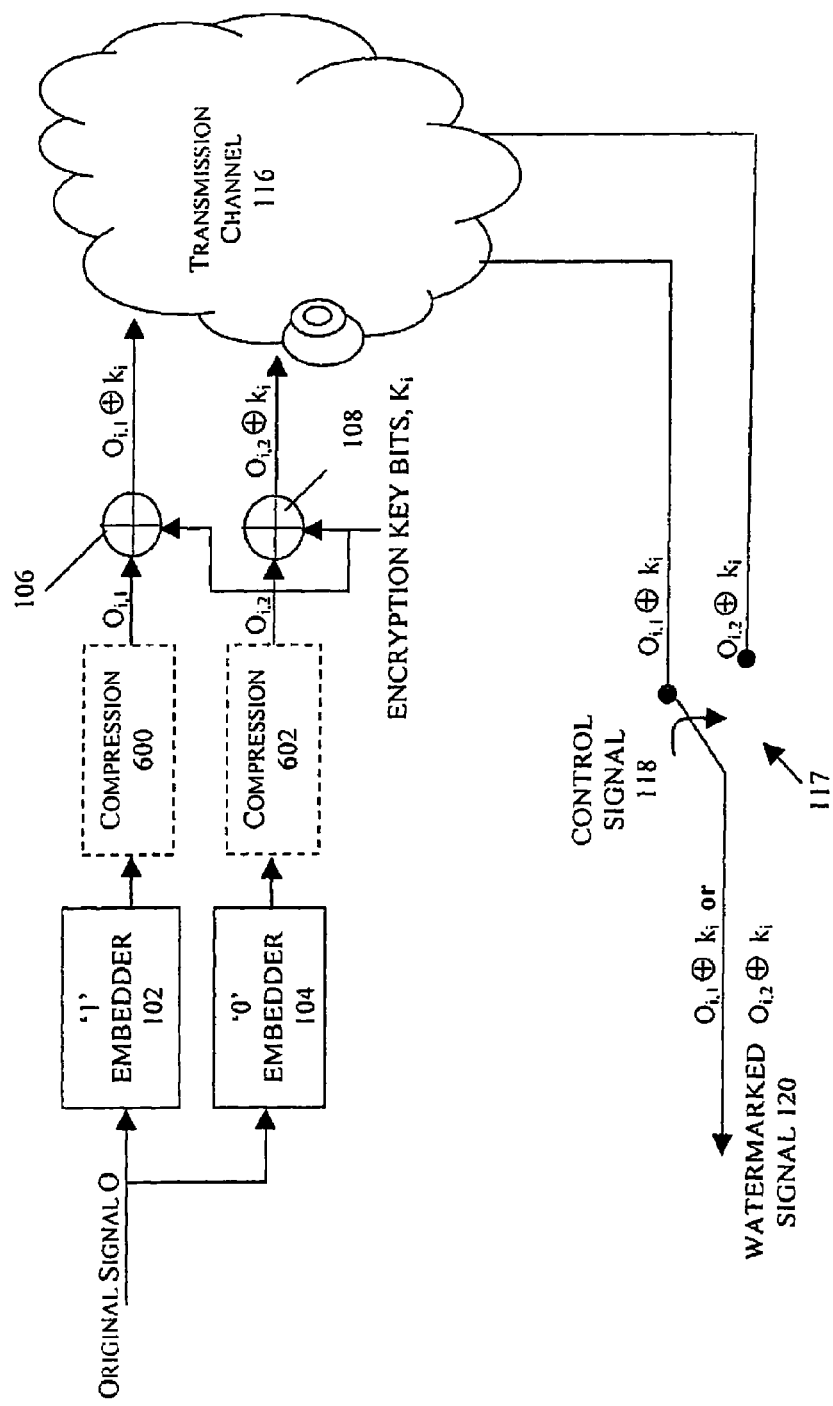
FIG. 1 is a block diagram showing the insertion of watermarks into a content encrypted with a stream cipher in accordance with an example embodiment of the invention.

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims.

Several techniques for the insertion of forensic or transactional watermarks have been previously described in the literature. Some of these techniques take advantage of the fact that computationally expensive operations of the embedding process may be carried out separately, at a pre-processing center, prior to the embedding of watermarks. Once a request for the delivery of a content is received, the pre-processed versions of the content signal may be combined, without requiring computationally expensive operations, to produce a content with embedded watermarks. For example, in accordance with commonly owned U.S. Pat. No. 6,912,315, adding forensic or transactional watermarks may be accomplished by pre-processing an original content with two or more different logical values to produce two or more embedded content signals. The two or more embedded content signals may then be transmitted to the 'client' (e.g., to an on-line distribution center or to a user premises), where the appropriate portions of the pre-processed signals are selected and assembled together to form an embedded content with a desired watermark value. Other variations and improvements to this technique are disclosed in commonly owned co-pending U.S. patent application Ser. No. 11/124,465. These improvements produce a versatile watermarking system that requires a smaller bandwidth for the transmission and storage of reduced-scale signals that enable the insertion of forensic marks. The term reduced-scale signal (as opposed to full-scale signal) is used to refer to any signal with a smaller information content than the original content. For example, such signals may have a smaller duration, dynamic range, bandwidth and/or spatial resolution than the original content.

Alternatively, as disclosed in commonly owned U.S. Pat. No. 6,430,301, each of two pre-processed versions of the content comprises two separate regions. The first region, called the Matching Signal Interval (MSI), either contains no watermark value or is embedded identically with the same watermark value in both pre-processed versions of the content (this is referred to as the region with 'common watermark'). The second region, which is time interleaved with the first region, is embedded with a first or a second logical value, in the first or second pre-processed versions of the content, respectively. Transactional watermarking may be implemented by assembling proper portions of the first version of the content with proper portions of the second version of the content to produce an embedded content. The cutting and splicing of the two versions all occur within the MSI regions, where two signals are identical.

The various embodiments of the present invention enable the insertion of watermarks, such as the ones produced by the aforementioned watermarking systems, into an encrypted data stream. The disclosed methods and systems are applicable to systems that utilize stream ciphers, block ciphers, and symmetric or asymmetric encryption algorithms. In accordance with further embodiments of the present invention, such watermarks may be embedded into "compressed-and-encrypted" data signals. This is accomplished without requiring the content to be decrypted or decompressed, and without any knowledge of the encryption or decryption keys. Although most of the example embodiments of the present invention are described by illustrative examples that involve the embedding of binary watermark values, it should be understood that these techniques are readily extended to include the embedding of non-binary data symbols or embedding of multiple layers of watermarks (e.g., such as disclosed in the commonly owned U.S. Pat. No. 6,912,315, and commonly owned co-pending U.S. patent application Ser. No. 11/124,465) that can be embedded and extracted independently from one another.

Stream Ciphers:

The particular methodology used to achieve the various goals of the present invention depends on the type of encryption algorithm and other configuration parameters of the media delivery and preparation system. The following describes the insertion of watermarks in example embodiments of a system that utilizes stream ciphers.

Case 0: This is the default case, where the original content signal, and/or a set of signals containing embedded logical values, is encrypted and transmitted to the target destination in accordance with an example embodiment of the invention. The received signals are then decrypted and appropriately cut-and-spliced, in accordance with any one of the above-described prior art transactional watermarking techniques, to produce a content signal with a desired watermark value. The embedded content may then be optionally re-encrypted and transmitted to the next destination. The re-encryption is typically not necessary if the content watermarking and subsequent transmission are conducted all within a secure environment. This technique is equally applicable to all types of encryption algorithms and different variations of forensic/transactional watermarking since the watermark is applied to the plaintext signal.

Case 1: In this example, illustrated in FIG. 1, two full-scale versions of the original content O signal are generated at the pre-processing stage, by embedding a first logical value in a first version of the original content signal O at embedder 102 and embedding a second logical value in a second version of the original content O at embedder 104. The term "full-scale" refers to a signal that is substantially similar to the original content signal as described in the pending U.S. patent application Ser. No. 11/124,465. In FIG. 1, embedder 102 is shown as embedding a logical "1" in the first version of the original content signal O and embedder 104 is shown as embedding a logical "0" in the second version of the original content signal O. However, those skilled in the art will appreciate that embedders 102, 104 may both be capable of embedding either logical 1s or 0s in the original content signal O.

Each full-scale version $O_{i,1}$, $O_{i,2}$ is then encrypted and transmitted to the client. This operation may be better understood by examining the following equations. The first full-scale encrypted stream, which is embedded with a first logical value, may be represented by:

$$c_{i,1} = O_{i,1} \oplus k_i,$$ Equation (3), where, i represents the bit position within the stream of bits in the first version of the full-scale signal, $O_{i,1}$ represents the unencrypted version of the first full-scale signal at position i, and $c_{i,1}$ represents the encrypted version of the first full-scale signal at position i. The second full-scale encrypted stream, which is embedded with a second logical value, may be similarly represented by:

$$c_{i,2} = O_{i,2} \oplus k_i$$ Equation (4), where, $O_{i,2}$ represents the unencrypted version of the second full-scale signal at position i, and $c_{i,2}$ represents the encrypted version of the second full-scale signal at position i. The encryption process occurs on a bit-by-bit basis and may comprise XORing each version with key bit stream, $k_i$ at XOR operators 106 and 108, respectively, to produce the two full scale encrypted streams $O_{i,1} \oplus k_i$ and $O_{i,2} \oplus k_i$. The encryption of the two versions $O_{i,1}$, $O_{i,2}$ must occur independently from one another, but synchronously with the same encryption key stream $k_i$. The two full scale encrypted streams $O_{i,1} \oplus k_i$ and $O_{i,2} \oplus k_i$ may then be transmitted over transmission channel 116 to the client side (user location or user device). At the client side, the desired portions of one stream (e.g., stream $O_{i,1} \oplus k_i$) may be combined (on a bit-by-bit basis) with the desired portions of the other stream (e.g., $O_{i,2} \oplus k_i$) in accordance with a control signal 118 to produce a composite encrypted stream 120 with embedded watermarks.

Since the two versions are encrypted synchronously with the same key bit stream, $k_i$, the bits of one encrypted stream $O_{i,1} \oplus k_i$ may replace the corresponding bits of the other stream $O_{i,2} \oplus k_i$ to form a composite data stream (watermarked signal 120). The composite signal 120 maintains its encryption and may be fully decrypted using the same encryption key stream, $k_i$.

In FIG. 1, and in the remainder of this disclosure, the term 'control signal' is used to generically represent any combination of instructions, timing information, logical values or other signals that enable the assembly of particular segments of the two or more versions of the content signal. In a simple example involving the insertion of transactional watermarks in accordance with FIG. 1, a particular sequence of bits that identify the purchaser of a content may be required to be embedded into the content. The control signal 118, in this example, may simply enable the switching between the two encrypted streams at watermark bit boundary locations (e.g., using switch 117 controlled by control signal 118). For example, if the watermarking scheme calls for watermarking bits that span 100 samples of the host content signal, the switching occurs at content bit locations 101, 201, 301, . . . . Obviously, if the present watermark bit has the same value as the previous watermark bit, no switching needs to occur for the present bit duration. In other examples, the generation of the control signal 118 may include more complicated operations. These operations may involve the generation of auxiliary information that comprise watermark payload (e.g., the generation of a time stamp from local clock), the generation of synchronization sequences, the generation or selection of bit transition functions, the application of various channel coding techniques, such as error correction codes, and other necessary operations to produce a stream of logical values that are subsequently embedded into the content.

The transmission channel 116 shown in FIG. 1 represents any one or more of a variety of communication channels that may be used to transmit or store information. Examples of such communication channels include, but are not limited to, the Internet, local area networks, wide area networks, satellite and over-the-air broadcast channels, magnetic, optical or electronic storage devices, and the like.

Case 2A: In the example embodiment shown in FIG. 2A, three signals are transmitted to the client side. One full-scale signal is a version of the original host content signal O. This version of the original host content signal $O_i$ is encrypted on a bit-by-bit basis at XOR operator 110 to produce encrypted stream $O_i \oplus k_i$. The other two signals are produced by first embedding two logical values in separate versions of the original content signal O (at embedders 102 and 104) to produce two embedded signals $O_{i,1}$ and $O_{i,2}$ as discussed above in connection with FIG. 1. These signals $O_{i,1}$ and $O_{i,2}$ are next XORed with the original signal $O_i$ at XOR operators 200, 202, respectively to produce signals $O_{i,1} \oplus O_i$ and $O_{i,2} \oplus O_i$. Signals $O_{i,1} \oplus O_i$ and $O_{i,2} \oplus O_i$ are optionally compressed, scrambled or encrypted (e.g., at compress/scramble/encrypt module 204) prior to their transmission over transmission channel 116 to the client side (e.g., a user location or user device).

These optional operations at module 204 may be necessary to reduce the transmission bandwidth and to enhance the security of the transmitted signals. The information content of the generated signals, $O_{i,1} \oplus O_i$ and $O_{i,2} \oplus O_i$, is typically substantially smaller than the original content signal since these signals are produced by XORing two substantially similar signals (recall that XOR operation produces a '1' value only if the two operands are different). Thus the signals generated by XOR operations may comprise many zeroes, a property that makes them a good candidate for the application of lossless compression techniques. In other cases, where the embedded and original signals contain large differences (for example, as a result of applying watermark masking/concealment techniques during the embedding process), such compression techniques may not be as effective.

Upon the reception and appropriate decompression, descrambling or decryption at module 208, appropriate portions of the signals $O_{i,1} \oplus O_i$ and $O_{i,2} \oplus O_i$ may be XORed (e.g., at XOR operator 210) with the original encrypted content, $O_i \oplus k_i$, in accordance with the control signal 218A, producing a final composite encrypted watermarked signal 220, portions of which contain the first embedded watermark value (e.g., a logical "1") and portions of which contain the second embedded watermark value (e.g., a logical "0").

Figure 2A:
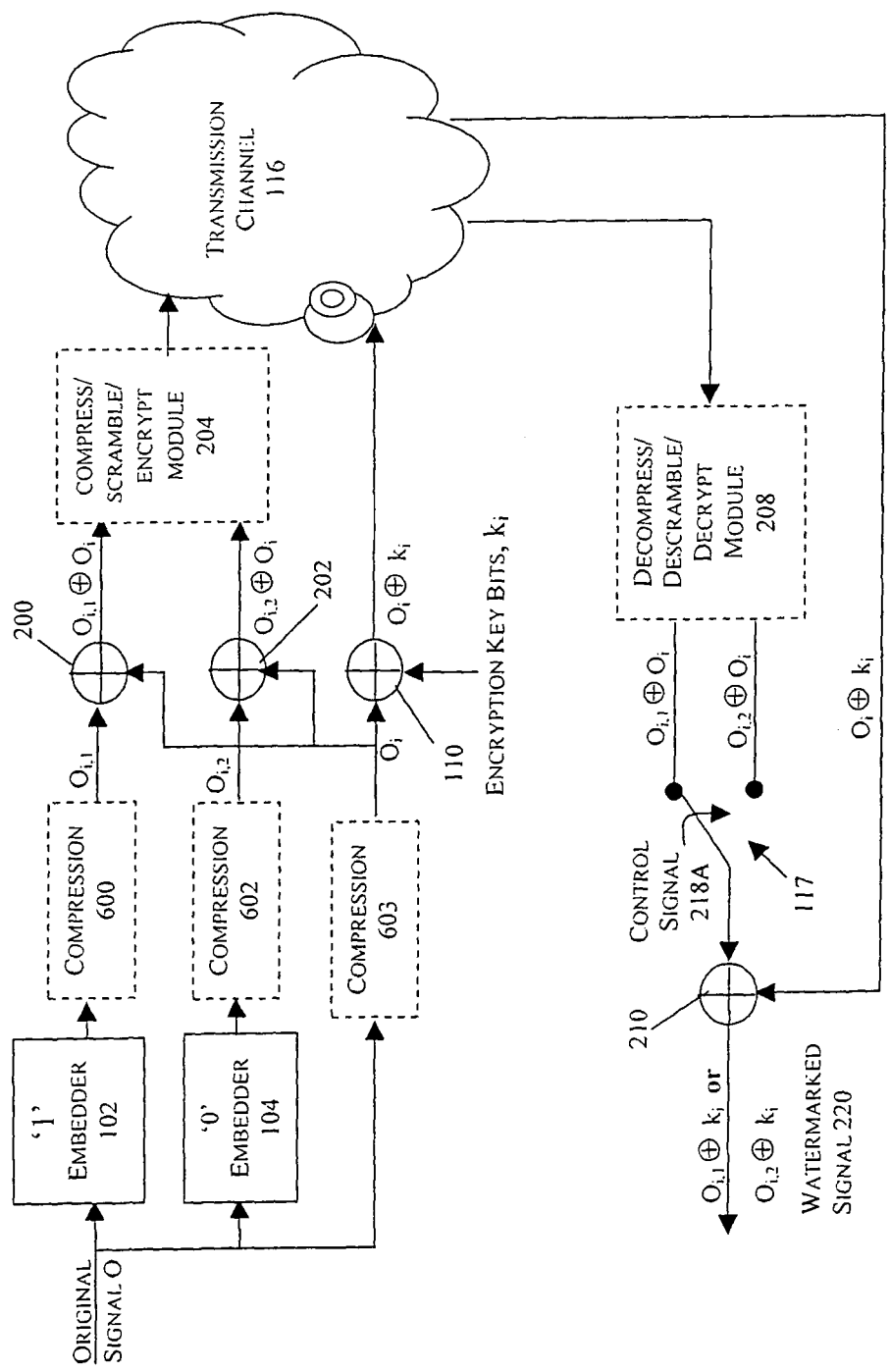
FIG. 2A is a block diagram showing the insertion of watermarks into a content encrypted with a stream cipher in accordance with an example embodiment of the invention.

One of the features of the watermarking technique described in FIG. 2A is its ability to decouple watermarking and encryption operations. In other words, the embedders 102, 104 and XOR operators 200, 202 in this architecture do not need access to the encryption keys at all. In addition, the original signal O remains intact and can be independently transmitted to other destinations that do not require (or perhaps forbid) the presence of embedded watermarks. Using this technique, it is also possible to produce the appropriate watermark signals for a content that is already at a user premises. In this case, if an exact copy of the original content signal O is available at the pre-processing center, the signals $O_i \oplus O_i$ and $O_{i,2} \oplus O_i$ may be generated and transmitted to the user. This allows dynamic modifications of watermarking techniques and parameters that can be subsequently transmitted to the client for insertion of the watermark.

Figure 2B:
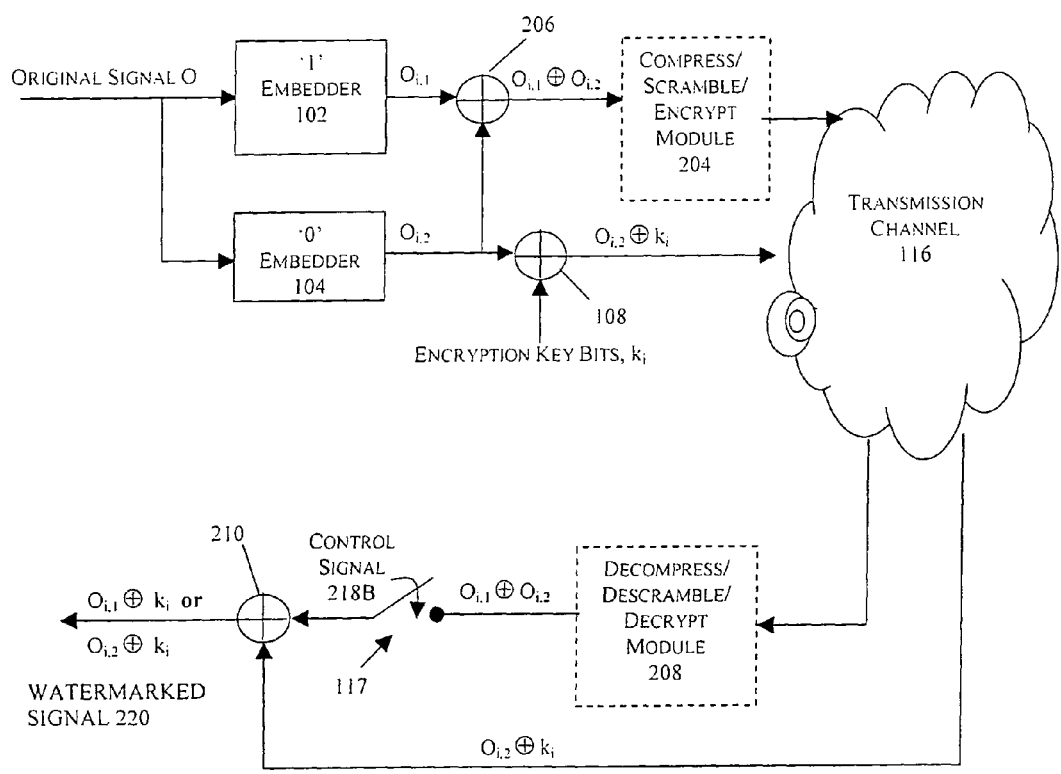
FIG. 2B is a block diagram showing the insertion of watermarks into a content encrypted with a stream cipher in accordance with an example embodiment of the invention.

Case 2B: The example embodiment shown in FIG. 2B is similar to Case 2A above, with the exception that only two signals are generated and transmitted to the desired destination. The two streams, $O_{i,1}$ and $O_{i,2}$, are produced by embedding separate versions of the original content signal O with the first and second logical values at embedders 102, 104 as discussed above in connection with FIGS. 1 and 2A. These signals, $O_{i,1}$ and $O_{i,2}$ and are XORed with each other at XOR operator 206 to produce the signal $O_{i,1} \oplus O_{i,2}$. Similar to the reasoning discussed above in Case 2A, this signal may contain a larger proportion of zero-valued bits and may be a good candidate for the application of a lossless compression technique. Further scrambling and encryption operations may also be applied (e.g., at module 204) to protect this signal prior to transmission to the client over transmission channel 116. Appropriate decompression, descrambling or decryption may be applied as necessary to signal $O_{i,1} \oplus O_{i,2}$ at module 208.

One of the embedded content signals (i.e., the signal $O_{i,2}$ in the example embodiment of FIG. 2B) is encrypted on a bit-by-bit basis with encryption key stream $k_i$ at XOR operator 108 to produce $O_{i,2} \oplus k_i$ which is also transmitted to the client side over transmission channel 116. On the reception side, the signal $O_{i,1} \oplus O_{i,2}$ may be XORed with the signal $O_{i,2} \oplus k_i$ at XOR operator 210 in accordance with a control signal 218B to produce an encrypted watermarked content signal 220 with appropriate embedded watermark values. In the example embodiment of FIG. 2B, when the switch 117 is in open position, the encrypted signal $O_{i,2} \oplus k_i$ appears unchanged at the output of the XOR operator 210. When in accordance with the control signal 218B, the switch 117 is flipped to a closed position, a portion of the signal $O_{i,1} \oplus O_{i,2}$ is XORed with a corresponding portion of the encrypted signal $O_{i,2} \oplus k_i$, producing an encrypted segment $O_{i,1} \oplus k_i$ at the output of the XOR operator 210.

The example watermarking technique described in connection with FIG. 2B produces the same embedded content as the that produced by the example watermarking technique described in connection with FIG. 2A, but it requires a smaller transmission bandwidth. In the architecture of FIG. 2B, it only suffices to transmit two signals to the client, one of which, namely $O_{i,1} \oplus O_{i,2}$, is a reduced-scale signal (or can be converted to a reduced-scale signal).

Figure 3A:
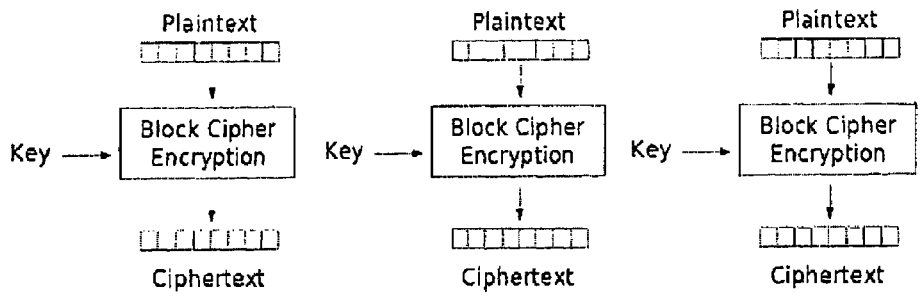
FIG. 3A illustrates an Electronic Codebook (ECB) block encryption scheme.
Figure 3B:
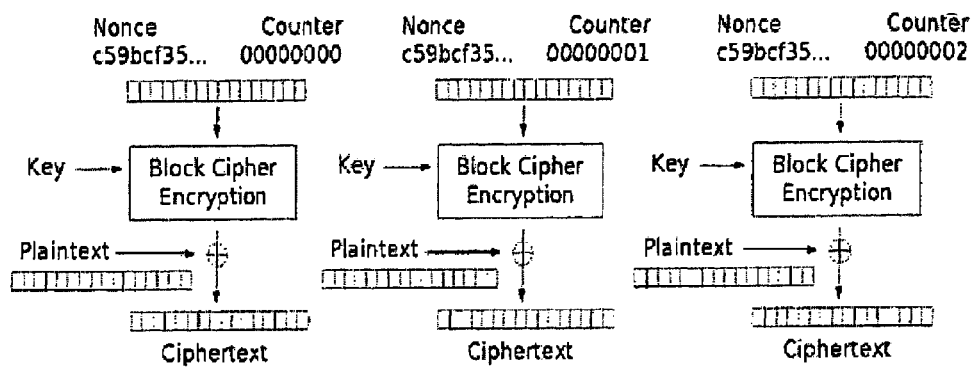
FIG. 3B illustrates a Counter (CTR) block encryption scheme.
Figure 3C:
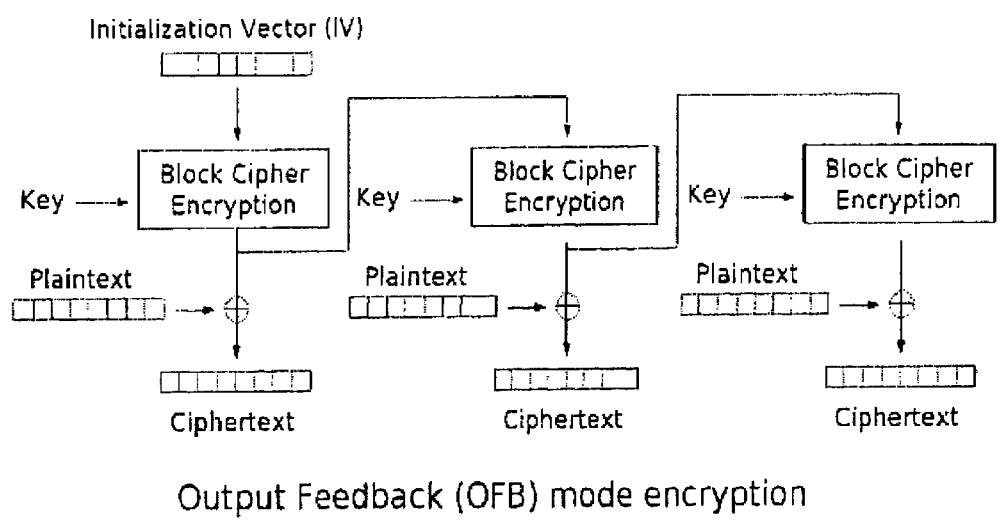
FIG. 3C illustrates an Output Feedback (OFB) block encryption scheme.

Block Ciphers:

The above described watermark insertion techniques described in the context of stream ciphers may be readily adapted to operate with block encryption algorithms. FIGS. 3A, 3B and 3C provide schematic diagrams of three typical block encryption modes of operation that are well known in the art. In Electronic Code Book (ECB) mode of FIG. 3A, each block of content data (plaintext) is replaced by an alternate block of encrypted data of the same size (ciphertext). In the Counter (CTR) mode of operation shown in FIG. 3B, encryption key blocks (ciphertext blocks) are generated for each data block (plaintext) by encrypting successive values of a "counter". The counter can be any simple function which produces a sequence which is guaranteed not to repeat for a long time. In Output Feedback (OFB) mode of operation shown in FIG. 3C, an initialization vector (IV) (which can be a random number) is used to generate the encryption key for the first block of plaintext; this key is used to generate other encryption keys for the subsequent blocks of plaintext. In both the CTR and OFB configurations, the generated key blocks are XORed with the plaintext blocks to form the block encrypted content signal.

Figure 4:
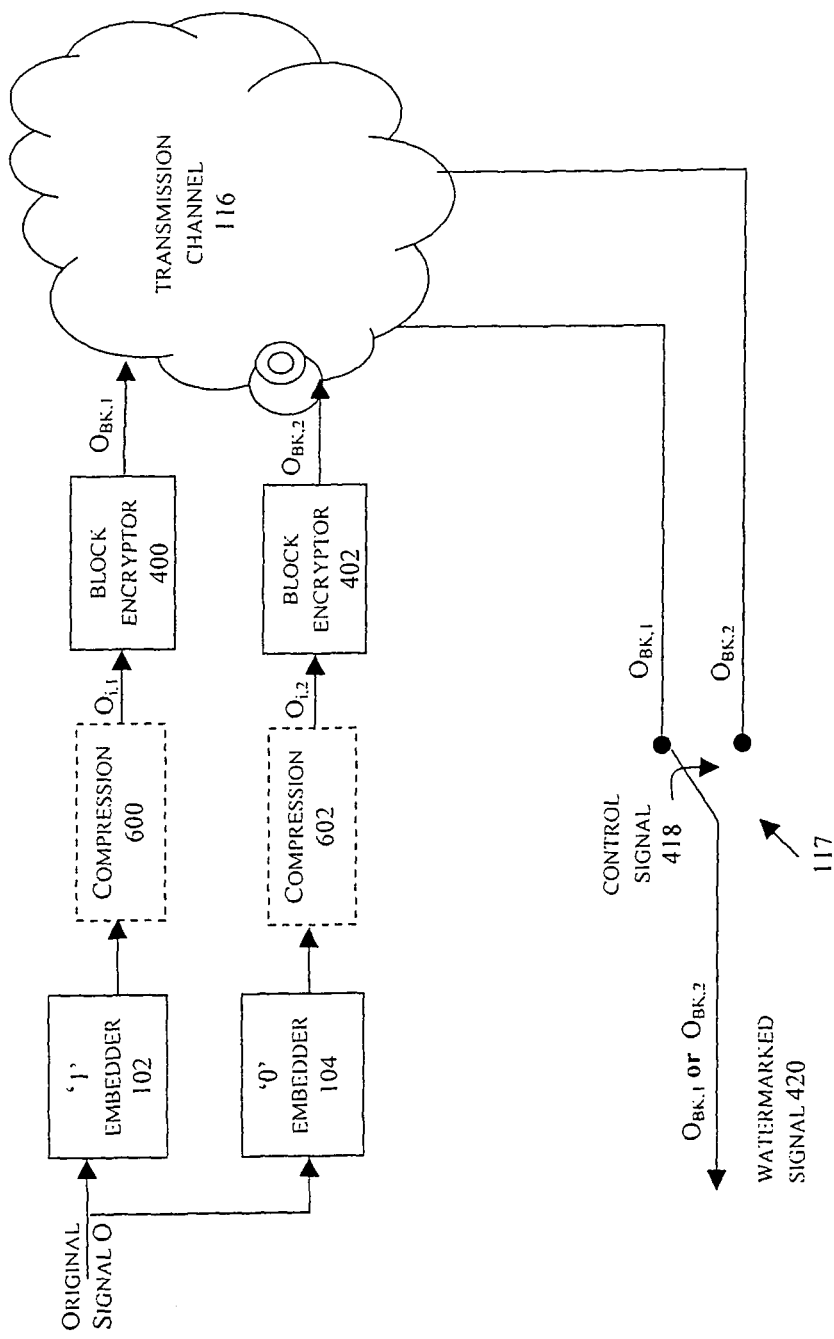
FIG. 4 is a block diagram showing the insertion of watermarks into a content encrypted with a block cipher in accordance with an example embodiment of the invention.

The insertion of watermarks into such block encrypted data streams can be done by adjusting a few watermark design parameters. One such adjustment would be to select the watermark bit durations to be an integer multiple of cipher block size. For example, an audio stream with 16-bit sample values and a block cipher size of 128 bits may be used. The watermarking system may be designed to embed a single watermark bit into 440 samples of the audio content (this corresponds to a watermark bit rate of approximately 100 bits per second for a 44.1 KHz audio signal). Thus 440×16=7040 bits of the host signal would be required for the embedding of each watermark bit. If the audio signal were encrypted in blocks of 128 bits, then 740/128=55 cipher blocks would be required to carry each watermark bit. An exemplary procedure would involve the embedding of the host signal with two different logical values to produce two embedded signals, wherein each embedded logical value spans 440 samples of the host signal. Each of the two embedded signals produced this way may then be grouped into 128-bit blocks, encrypted, and transmitted to the desired destination. The encryption must take place synchronously for both versions of the embedded content signal with the same encryption key. FIG. 4 describes an exemplary embodiment of this procedure. The '1' and '0' embedding modules 102, 104 produce two embedded signals $O_{i,1}$ and $O_{i,2}$ from the original content signal O such that each embedded watermark symbol spans one or more full encryption blocks. The embedded signals, $O_{i,1}$ and $O_{i,2}$, are next encrypted by the block encryptor modules 400, 402 to generate encrypted signals $O_{BK,1}$ and $O_{BK,2}$, which can then be transmitted to the client via transmission channel 116. In FIG. 4, the subscript B designates the block processed signal samples and the subscript K is used to designate such blocks that are encrypted. Upon the reception of encrypted block signals $O_{BK,1}$ and $O_{BK,2}$, appropriate portions of these signals are selected in accordance with the control signal 418, and assembled together to produce an embedded content signal 420. Using the exemplary numerical values discussed earlier, the control signal 418 must switch between the two signals at multiples of 55 encryption blocks (i.e., 1 embedded watermark bit) or 740 encrypted bits.

The above technique may be modified to conform to other encryption block sizes, sampling rates or bit depth values. These modifications may produce different watermark bit rates in order to make the duration of each watermark bit an integer multiple of encryption block size. For example, if the bit depth of the incoming audio signal in the above example were to become 32 bits, a watermark bit rate of approximately 200 bits-per-second would be required to produce the same number of blocks per bit (i.e., 55, 128-bit encryption blocks per watermark bit). Alternatively, the number of blocks-per-watermark-bit may be changed from 55 to 110 to maintain the watermark bit rate at ~100 bits-per-second while accommodating 32-bit audio sample values. Furthermore, the extension of the above described technique to other embedding configurations, such as the ones described in FIGS. 2A and 2B, is similarly accomplished by replacing the bit-wise operations by block-wise operations.

Asymmetric and Public-Key Algorithms

The methods and systems of the various embodiments of the present invention can also be used in conjunction with asymmetric encryption algorithms. These algorithms use different keys for encryption and decryption of the content and may involve different algorithmic operations for encryption and decryption processes. It is important to note that the previously disclosed analysis did not require any references or knowledge of decryption keys or decryption algorithms. Thus, these systems and methods may be readily adapted to operate with asymmetric algorithms, as well. In addition, some asymmetric algorithms require modular arithmetic operations, including exponentiation; these operations and the necessary modifications to the watermark insertion techniques of the present invention will be discussed below.

RSA is one of the most widely used asymmetric encryption algorithms. RSA uses one key, called the public key, for encryption and another key, called the private key, for decryption of the content. The details of RSA encryption algorithm may be found in a many publications such as, B. Schneier's "Applied Cryptography", John Wiley & Sons: New York, 1996; ISBN: 0-471-12845-7. The basic RSA encryption operation can be described by the following equation:

$$c = O^{k[modulo\ n]} \qquad \text{Equation (5),}$$

where c is the encrypted data, O is the original, unencrypted data, k is the encryption key, and n is an encryption parameter that is a product of two random prime numbers. In a public-key encryption algorithm, k and n are known public parameters. The decryption is carried out according to the Equation 6:

$$O = c^{d[modulo\ n]} \qquad \text{Equation (6),}$$

where d is the private key and is only known to authorized parties. The encryption and decryption operations are carried out in modulo-n arithmetic. Modular arithmetic, and various hardware implementations thereof, is well known in the art and is described in many publications such as, David N. Amanor, "Efficient Hardware Architecture for Modular Manipulation", Master's Thesis, Communications and Media Engineering, University of Applied Sciences Offenburg, Germany, February 2005. In order to encrypt a signal, the signal is typically broken up into smaller numerical blocks. The RSA (or similar asymmetric) encryption algorithm can be better illustrated by considering the following numerical example.

Let's assume O=688232678, n=3337, d=1019 and block size=3 digits. The original signal O may be broken up into blocks of 3 digits, namely:
O(1)=688,
O(2)=232, and
O(3)=678.
Each block may then be encrypted to produce:
c(1)=1570,
c(2)=2756, and
c(3)=2091.
The encrypted message would then be the concatenation of encrypted blocks:
c=157027562091.

In the watermarking system of the present invention, each pre-processed version of the original content contains one logical value. For example, the embedding process may produce two embedded sample values in the following manner:
$O_1(1)=698$, $O_2(1)=678$,
$O_1(2)=240$, $O_2(2)=212$,
$O_1(3)=700$, $O_2(3)=670$,
where $O_1$ and $O_2$ represent the embedded signals with the first and second logical values, respectively. These signals are subsequently encrypted to produce encrypted signals that are transmitted to the client. The insertion of watermarks into the encrypted stream then becomes identical to the situation that was described above in connection with FIG. 4. Portions of the received encrypted signals may then be selected in accordance to a control signal and spliced together to form an encrypted content signal with a particular watermark value. Since the encryption occurs in blocks, the same watermark design considerations that were discussed in connection with FIG. 4 are applicable.

Figure 5:
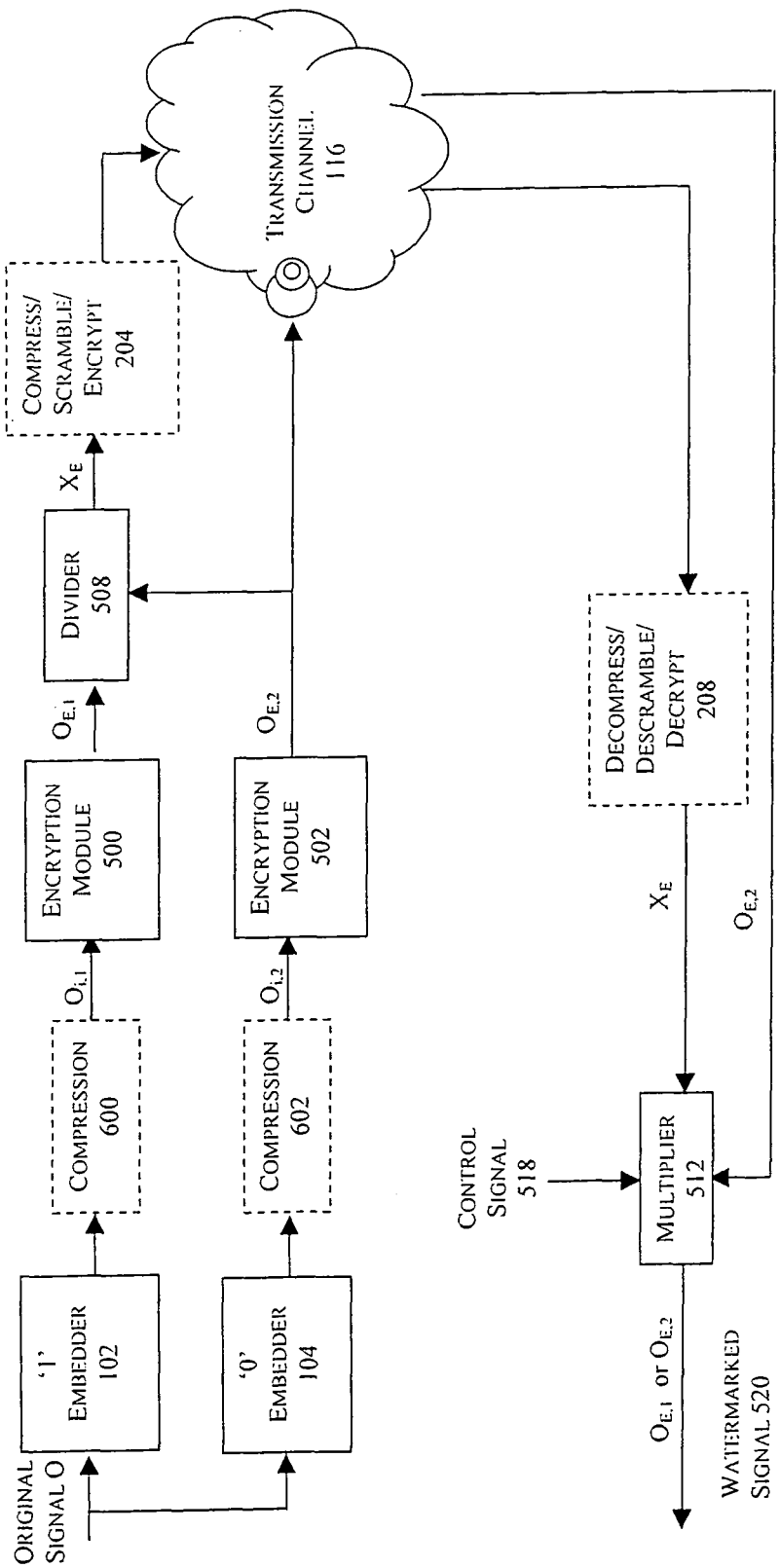
FIG. 5 is a block diagram showing the insertion of watermarks in an RSA-like encrypted content in accordance with an example embodiment of the present invention.

It is also possible to apply the above techniques to produce systems that are analogous to the ones described in FIGS. 2A and 2B. For illustration purposes, only the configuration of FIG. 2B will be analyzed since those skilled in the art will appreciate that similar procedures may be adapted and used in conjunction with the system of FIG. 2A. The basic idea behind this concept is that a first version of the content embedded with a first logical value, that is also encrypted with an RSA-like algorithm, may be converted to a second version of the content embedded with a second logical value, that is also encrypted, using a multiplicative factor. In order to facilitate the understanding of this concept, the encrypted blocks, $O_1(1)=698$ and $O_2(1)=678$, in the above numerical example are examined. The two embedded blocks $O_1(1)$ and $O_1(2)$ are related to one another by a multiplicative factor (i.e., $O_1(1) = (698/678)*O_1(2)$ ). In modulo arithmetic this relationship is expressed as: $O_1[modulo\ n] = X*O_2$. Determination of the factor X involves modulo division, which is well known in the art and will not be described here. The embedding of watermarks in accordance to the present invention may be carried out using modulo arithmetic as illustrated in the example embodiment shown FIG. 5. Separate versions of the original content signal O are embedded with logical values at embedders 102 and 104 to produce two embedded content signals, $O_{i,1}$ and $O_{i,2}$. The two embedded content signals, $O_{i,1}$ and $O_{i,2}$, are encrypted (in this context with an RSA-like algorithm) at encryption modules 500, 502, respectively, to produce the signals $O_{E,1}$ and $O_{E,2}$. Next, the multiplicative factors, $X_E$, that relate the two embedded content signals, are determined using divider module 508. The subscript E is used to indicate that the multiplicative factors are determined for each encryption unit (i.e., units of bits that are encrypted together). This multiplicative factor may be calculated based on specific parameters of the encryption algorithm using modulo arithmetic. For the RSA example described above, only the knowledge of the public parameter n and the block size (i.e., 3 digits) is required at both the pre-processing center (e.g., operations prior to transmission over transmission channel 116) and at the client premises (e.g., a user location or device capable or carrying out operations occurring after transmission). The multiplicative factors $X_E$ may be compressed, scrambled, or encrypted at module 204 as required prior to transmission over transmission channel 116. On the reception side, the multiplicative factors, $X_E$, may be decompressed, descrambled, or decrypted as needed at module 208. The multiplicative factors $X_E$ may then be multiplied by the second embedded content, $O_{E,2}$, at multiplier 512 in accordance with a control signal 518 to produce an encrypted content 520 with embedded watermark values. The multiplier module 512 may multiply $O_{E,2}$ by either $X_E$ or 1 (i.e., pass $O_{E,2}$ through unchanged) to produce an encrypted output signal that contains appropriate concatenations of $O_{E,1}$ and $O_{E,2}$.

While the above examples illustrated the application of the present invention to an RSA-like encryption algorithm, the presented techniques are equally applicable to other asymmetric encryption algorithms, including but not limited to, Pohlig-Hellman, Rabin, ElGamal as well as elliptical curve encryption algorithms.

Insertion of Watermarks into Compressed Domain

Figure 6:
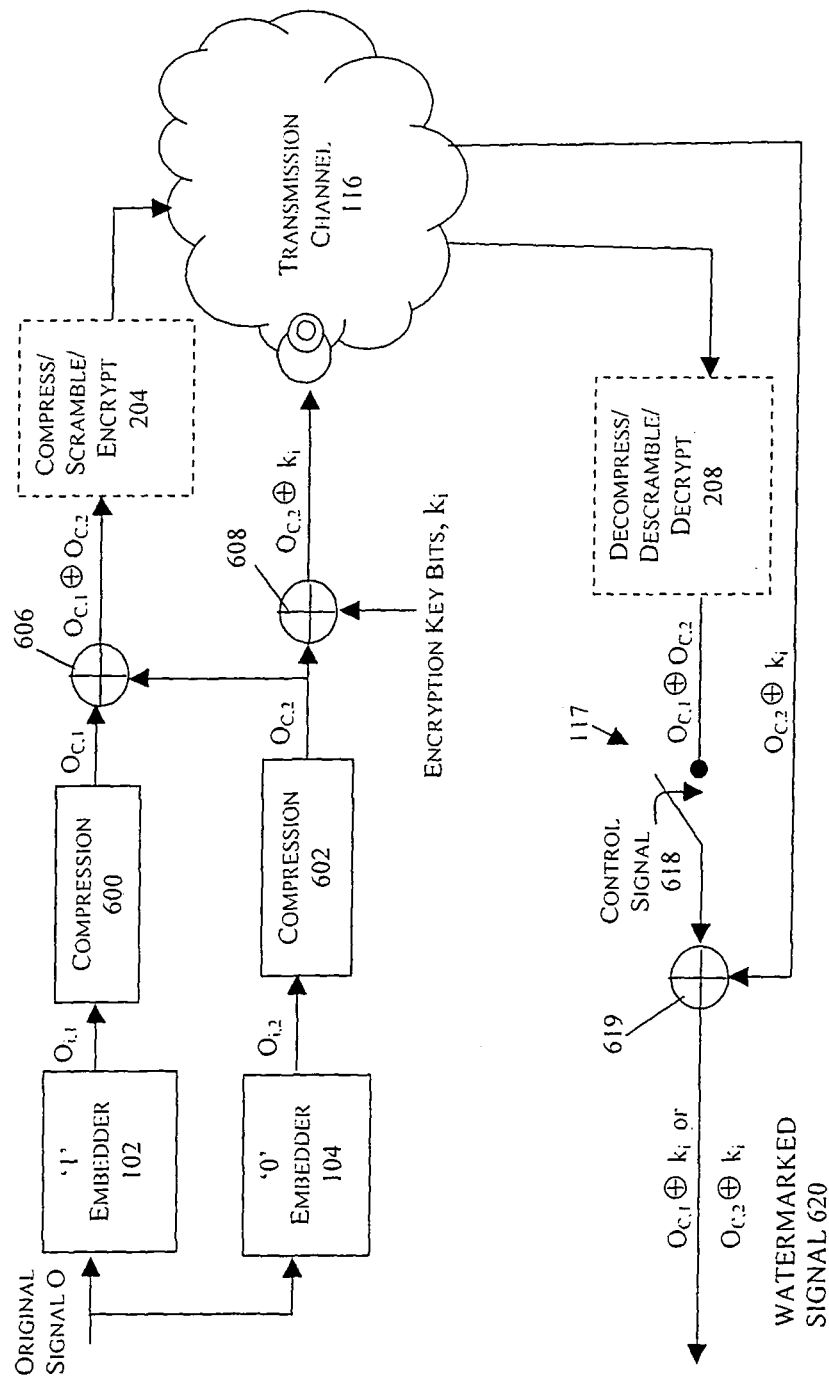
FIG. 6 is a block diagram showing the insertion of watermarks into a compressed and encrypted content in accordance with an example embodiment of the invention.

The above-described techniques for the insertion of forensic watermarks may be adapted to operate with an original content signal that is in a compressed format. For a majority of compression schemes, data signals are divided into blocks that are subsequently compressed using a variety of techniques. Examples of such compression algorithms include MPEG, JPEG, JPEG2000, AAC, AC3, and the like. What is important is for the particular compression technique to operate on blocks of signal content that can be independently compressed and decompressed. In MPEG compression, for example, a Group of Pictures (GOP) may be considered an independent compression block. FIG. 6 shows an example embodiment of the present invention that includes compression. Other component of this figure are similar to the ones described above in connection with FIG. 2B (except for the "compression" blocks 600, 602 that compress the embedded versions of the original content).

As shown in FIG. 6, separate versions of the original content signal O are embedded with logical values at embedders 102 and 104 to produce two embedded content signals, $O_{i,1}$ and $O_{i,2}$. These signals $O_{i,1}$ and $O_{i,2}$ are compressed at compression modules 600, 602, respectively. The signals at the output of the two compression modules 600, 602 are labeled $O_{C,1}$ and $O_{C,2}$, respectively, in order to designate compressed signals that are generated in independent blocks (i.e., compression blocks). In the upper path, signals $O_{C,1}$ and $O_{C,2}$ are XORed together at XOR operator 606 on a compression block-by-block basis to produce a "difference" signal between the two versions of the embedded-and-compressed signals. The difference signal output from XOR operator 606 is designated $O_{C,1} \oplus O_{C,2}$. The difference signal $O_{C,1} \oplus O_{C,2}$ may be compressed, scrambled, or encrypted at module 204 as required prior to transmission over transmission channel 116. In the lower path, $O_{C,2}$ is XORed with the key sequence, $k_i$, at XOR operator 608, on a bit-by-bit basis to produce an encrypted stream $O_{C,2} \oplus k_i$. On the reception side, the signal $O_{C,1} \oplus O_{C,2}$ may be decompressed, descrambled, or decrypted as needed at module 208. One or more blocks of the signal $O_{C,1} \oplus O_{C,2}$ may then be appropriately selected in accordance with a control signal 618 and XORed with the signal $O_{C,2} \oplus k_i$ at XOR operator 619 to produce a compressed-and-encrypted signal 620 with the desired forensic watermark. The operation of the switch 117 of FIG. 6 is similar to the operation described in relation with FIG. 2B.

Similarly, the embodiments shown in FIGS. 1, 2A, 4, and 5 may employed where the original content signal is first embedded with the logical values and then compressed, as indicated by the optional compression modules 600 and 602 (shown in dashed lines in FIGS. 1, 2A, 4, and 5). The embodiment shown in FIG. 2A includes an additional optional compression module 603 for compressing the unmarked original content stream $O_i$, which is then provided to XOR operators 110, 200, and 202. When the techniques described in connection with the example embodiment of FIG. 6 are applied to the example embodiments of FIG. 1 and FIG. 2A that employ a stream cipher, it should be noted that the embedded watermark bit boundaries must coincide with, or be completely within, the compression block boundaries in order to guarantee the presence of full-length watermark bits in the final watermarked content. This requirement can be met by proper selection of watermarking parameters. Besides, most well designed watermarking systems can tolerate a certain level of watermark bit errors. Thus occasional failures to meet the above design criteria should not significantly interfere with proper detection of inserted watermarks. There are also additional watermarking techniques that can further alleviate this problem. These techniques will be described below in the context of block ciphers.

Figure 7:
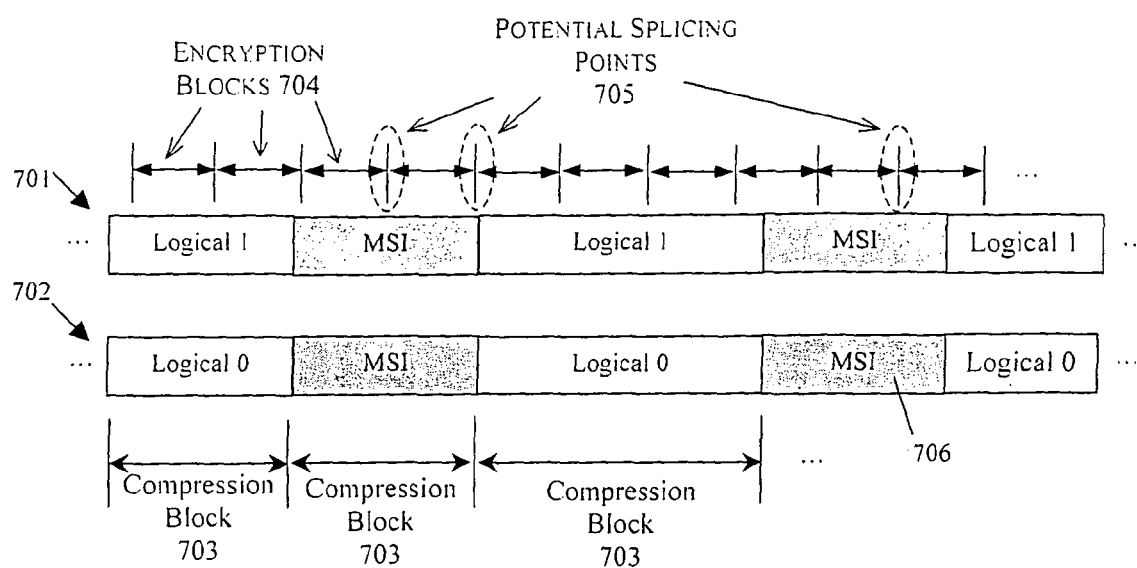
FIG. 7 shows the insertion of specially tailored watermarks into a compressed and encrypted content in accordance with an example embodiment of the invention.

In a block cipher environment, the operations of the forensic embedder may need further adjustments since two different block types are present: compression blocks and encryption blocks. The former often comprises a variable number of bits while the latter typically comprises a fixed number of bits. For example, in DES encryption algorithm, each block always comprises 64 bits of encrypted data, while a GOP block of compressed MPEG image data may contain any number of bits, depending on the particular nature of the motion picture frame sequence and the compression parameters. In such cases, it may not be possible to align the embedded bit boundaries, the compression block boundaries, and the encryption block boundaries all at the same time. In such cases, the general embedding technique may be modified in accordance with the technique described in U.S. Pat. No. 6,430,301 that was described earlier. Using this technique, embedded logical values may be separated by regions of the original content that are either A) not embedded at all, or B) are embedded with a common watermark in both versions of the embedded content. FIG. 7 shows an example embodiment of this technique used in conjunction with the present invention. Two versions of the original content 701 and 702 are shown to be embedded with logical 1 and logical 0 values, as well as containing Matching Signal Intervals (MSI) blocks 706, which are identically produced in both versions of the embedded signals 701 and 702. Each version of the content may be compressed and encrypted. As shown in FIG. 7, compression blocks 703 may have different lengths and may span several encryption blocks 704. In practical situations, each encryption block 704 is typically made up of 64 or 128 bits while a typical JPEG image frame may comprise several thousands of bits. The simplified diagram of FIG. 7 can be used to illustrate a scenario where there is at least one cutting-and-splicing opportunity within each MSI block 706. In FIG. 7, the duration of MSI segments 706 are shown to be equal, but it is understood that MSI segments 706 may be selected to have different lengths. If the watermarking algorithm of FIG. 7 is used for the embedding of the content, the insertion of watermarks may be carried out similar to the technique described in connection with FIG. 4. The two versions of the encrypted content may be transmitted, on the client side, combined together along the potential splicing points 705 to form an embedded content. The splicing must occur at the encryption block boundaries and must take place within the MSI region. Other variations of the embedding technique, i.e., block-based operations analogous to the ones shown in FIG. 2A and FIG. 2B, may be implemented using the embedding algorithm of FIG. 7. The modifications necessary to produce these systems involve obvious re-arrangements of the above-described techniques and will not be discussed further.

Three design guidelines related to the selection of MSI blocks warrant further attention: 1) there must exist at least one splicing opportunity (splicing point 705) within each MSI block 706; 2) MSI boundaries must be aligned with compression block boundaries; and 3) a watermark bit must fit within a single compression block 703. The first design guideline can be guaranteed by creating MSI segments that are at least twice the size of encryption blocks 704. The second guideline requires each MSI to span one or more complete compression blocks 703. Both of these conditions can be easily satisfied since an MSI region may be selected to be the unmarked original content of an arbitrary length. As for the third guideline, in practical situations, each compression block 703 usually comprises several thousands of bits whereas a typical watermark bit only spans a few tens or hundreds of bits. Furthermore, in an unlikely case where a watermark bit can not fit in a single compression block 703, signal cutting and splicing can occur, for example, at every two compression block boundaries. It is however more likely that each watermark bit is embedded in only a portion of each compression block 703. This can occur, for example, in an MPEG-compressed signal where a watermark bit is embedded in an I-frame only, while the compression block 703 is a GOP, comprising several additional P and B frames. In such cases, the unmarked portions of the compression block 703 may simply be considered as extensions of the adjacent MSI regions 706.

Since the cutting and splicing of the two compressed and encrypted data streams must occur at the compression block boundaries, the boundary locations must be known at the client side. In some cases, it may be possible to preserve the format of the compressed data stream subsequent to encryption. For example, in an MPEG compressed video, only the data within each GOP may be encrypted while keeping some meta data and header information in unencrypted format. This way, while the actual image/audio data is encrypted, the compression block boundaries remain easily recognizable. Such partial encryption of the signal content, however, may weaken the security of the system. In systems where the entire signal content is encrypted, additional synchronization and compression block boundary information may need to be delivered to the client. This can be accomplished by transmitting this additional information together with, or separately from, the embedded content signals. Table 1 below shows an example of how such information may be generated for proper identification of compression blocks.

TABLE 1

| Compression | Stream 1 Index | | Stream 2 Index | |
|---|---|---|---|---|
| Block Number | Start Bit | End Bit | Start Bit | End Bit |
| 1 | 100 | 5094 | 100 | 5090 |
| 2 (MSI) | 5095 | 14258 | 5091 | 14300 |
| 3 | 15001 | 15268 | 14301 | 15250 |
| 4 (MSI) | 15269 | 19269 | 15251 | 19298 |
| 5 | 19270 | 23684 | 19299 | 23701 |
| 6 (MSI) | 23685 | 35248 | 23702 | 35221 |
| ... | ... | ... | ... | ... |

For example, according to Table 1, the first compression block starts at bit location 100 in both encrypted streams and ends at bit locations 5094 and 5090 in streams 1 and 2, respectively. Using the example technique of Table 1, non-data segments of the compressed data streams may be easily identified and avoided when the cut-and-splice watermarking is carried out.

Table 1 provides only an example embodiment of the present invention and it should be appreciated that there are many different ways of conveying the compression block boundaries. For example, boundary locations may be expressed in terms of encryption block numbers (instead of bit numbers) or they may be expressed in terms relative to other compression blocks. It is also possible to separately identify non-data fields (e.g., headers, metadata, etc.) or other fields of interest within a table similar to the one shown in Table 1. Furthermore, the above described methods may be modified to be used in conjunction with other watermarking techniques that insert digital watermarks into a compressed data stream. One such technique is described in U.S. Pat. No. 5,687,191.

While specific examples were used in the foregoing disclosure to illustrate the embodiments of the present invention in association with one or more particular configurations of a watermarking system, it is understood that these techniques can be easily adapted to conform to alternate configurations of these watermarking systems. For example, in various embodiments of the present invention, such as those described in FIG. 1-2 and 4-7, multiple watermark embedding or encryption modules were presented to facilitate the understanding of disclosed concepts. However, it is understood that a single watermarking or encryption module may perform the necessary operations for all signal paths. Furthermore, the techniques disclosed in accordance with the present invention can be used in conjunction with data scrambling techniques that may not technically be classified as encryption algorithms. All necessary modifications required to adapt the present invention to such systems are considered to be well within the capabilities of a person of ordinary skills in the art and are not disclosed further.

It should now be appreciated that the present invention provides advantageous methods and apparatus for watermarking encrypted data streams.

Although the invention has been described in connection with various illustrated embodiments, numerous modifications and adaptations may be made thereto without departing from the spirit and scope of the invention as set forth in the claims.

What is claimed is:

1. A method for embedding auxiliary information symbols in an encrypted host content, comprising:
   produce a first encrypted content by (a) obtaining a plurality of segments of an original host content, (b) embedding each of said plurality of segments with a first logical value and (c) using a first encryption key or first set of encryption keys for encrypting each of said plurality of segments after having been embedded with said first logical value;

producing a second content that is not in encrypted format by (a) embedding a second logical value into said plurality of segments of said original host content and (b) modifying each particular segment that is embedded with said second logical value with a corresponding segment that is embedded with said first logical value, said corresponding segment being perceptually similar to said particular segment but for having said first logical value embedded therein instead of said second logical value; and combining a first set of segments from said first encrypted content with a second set of segments from said second content in a pre-defined manner, without decrypting said first encrypted content, to produce a composite encrypted host content with embedded auxiliary information, wherein said composite encrypted host content is decryptable using said first encryption key or said first set of encryption keys.

2. The method of claim 1, wherein said combining is performed without using encryption or decryption keys.

3. The method of claim 1, wherein said embedded auxiliary information persists throughout said host content after decryption of said composite encrypted host content.

4. The method of claim 1, wherein said first and second content are produced at a pre-processing center and said combining occurs at a user location.

5. The method of claim 1, wherein said host content comprises at least one of audio, video, text, and programming information.

6. The method of claim 1, wherein said first encrypted content is encrypted in accordance with at least one of:
a stream cipher,
a block cipher,
a symmetric encryption algorithm, and
an asymmetric encryption algorithm.

7. The method of claim 1, further comprising at least one of compressing, encrypting, or scrambling said second content and subsequently performing one of compressing, decrypting or descrambling prior to said combining.

8. The method of claim 1, wherein said pre-defined manner identifies at least one of an entity and a transaction.

9. The method of claim 1, wherein said host content comprises at least one of audio, video, text, and programming information.

10. The method of claim 1, further comprising:
compressing said plurality of segments after embedding with said first logical value and after embedding with said second logical value, wherein:
said encrypting comprises encrypting said compressed segments subsequent to said compressing; and
said modifying comprises modifying each particular segment that is embedded with said second logical value and subsequently compressed with said corresponding segment that is embedded with said first logical value and subsequently compressed.

11. A method for embedding auxiliary information symbols in an encrypted host content, comprising:
encrypting original host content using a first encryption key or first set of encryption keys to produce an unmarked encrypted host content;
producing a first content that is not in encrypted format by (a) obtaining a plurality of segments of said original host content (b) embedding each of said plurality of segments with a first logical value and (c) modifying each particular segment that is embedded with said first logical value with a corresponding segment from said original host content, said corresponding segment being perceptually similar to said particular segment that is embedded with said first logical value but lacking said embedded first logical value;

producing a second content that is not in encrypted format by (a) embedding a second logical value into said plurality of segments of said original host content and (b) modifying each particular segment that is embedded with said first logical value with a corresponding segment from said original host content, said corresponding segment being perceptually similar to said particular segment that is embedded with said second logical value but lacking said embedded second logical value;

selecting a first set of segments from said first content;
selecting a second set of segments from said second content; and
combining said first set and said second set of segments with said unmarked encrypted host content in a pre-defined manner, without decrypting said unmarked encrypted host content, to produce a composite encrypted host content with embedded auxiliary information, wherein said composite encrypted host content is decryptable using said first encryption key or said first set of encryption keys.

12. The method of claim 11, wherein said unmarked encrypted host content is encrypted in accordance with at least one of:
a stream cipher,
a block cipher,
a symmetric encryption algorithm, and
an asymmetric encryption algorithm.

13. The method of claim 11, further comprising at least one of compressing, encrypting, or scrambling said first and second content and subsequently performing one of compressing, decrypting or descrambling prior to said combining.

14. The method of claim 11, further comprising:
compressing said original host content prior to encrypting said original host content; and
compressing said plurality of segments after embedding with said first logical value and after embedding with said second logical value, wherein:
said encrypting comprises encrypting said compressed original host content; and
said modifying each particular segment that is embedded with said first or second logical values comprises modifying each particular segment that is embedded with said first or second logical values and subsequently compressed with said corresponding segment from said original host content subsequent to compression but prior to encryption of said original host content.

15. The method of claim 11, wherein said first and second contents are transmitted to a user premises, and combined with said unmarked encrypted host content that resides at said user premises.

16. The method of claim 11, wherein said pre-defined manner identifies at least one of an entity and a transaction.

17. The method of claim 11, wherein said host content comprises at least one of audio, video, text, and programming information.

18. A method for embedding auxiliary information symbols in a compressed and encrypted host content, comprising:
producing a first compressed-and-encrypted content by encrypting a first version of a compressed host content, said first version of said compressed host content having been produced by (a) obtaining a plurality of segments of an original host content, (b) embedding each of said plurality of segments with a first logical value, and (c) compressing said plurality of segments subsequent to said embedding of said first logical value;

producing a second compressed-and-encrypted content by (a) embedding a second logical value into each of said plurality of segments of said original host content, (b) compressing said plurality of segments subsequent to said embedding of said second logical value, (c) encrypting said plurality of segments subsequent to said compressing and (d) modifying each particular segment that is embedded with said second logical value and subsequently compressed and encrypted with a corresponding segment that is embedded with said first logical value and subsequently compressed and encrypted, said corresponding segment being perceptually similar to said particular segment prior to said compressing but for having said first logical value embedded therein instead of said second logical value; and combining a first set of segments from said first compressed-and-encrypted content with a second set of segments from said second compressed-and-encrypted content in a pre-defined manner, without decrypting or decompressing either the first set of segments or the second set of segments, to produce a composite compressed-and-encrypted host content with embedded auxiliary information.

19. The method of claim 18, wherein said first compressed-and-encrypted content and said second compressed-and-content comprise a matching signal interval.

20. The method of claim 19, wherein said combining occurs within said matching signal interval.

21. The method of claim 18, wherein said first compressed-and-encrypted content comprises a partially encrypted content.

22. The method of claim 18, wherein additional meta data corresponding to said first compressed-and-encrypted content and said second compressed-and-encrypted content are produced to facilitate said combining.

23. The method of claim 18, wherein said first encrypted content is encrypted in accordance with at least one of:
 a stream cipher,
 a block cipher,
 a symmetric encryption algorithm, and
 an asymmetric encryption algorithm.

24. The method of claim 18, wherein said pre-defined manner identifies at least one of an entity and a transaction.

25. The method of claim 18, wherein said host content comprises at least one of audio, video, text, and programming information.

26. A method for embedding auxiliary information into an encrypted host, comprising:

receiving a first content that is in encrypted format, the first content comprising a plurality of embedded segments, each of said plurality of embedded segments corresponding to a segment of an original host content having been embedded with a first logical value and subsequently having been encrypted using a first encryption key or set of encryption keys;

receiving a second content that is not in encrypted format, the second content having been produced by (a) embedding a second logical value into said plurality of segments of said original host content and (b) modifying each particular segment that is embedded with said second logical value with a corresponding segment that is embedded with said first logical value, said corresponding segment being perceptually similar to said particular segment but for having said first logical value embedded therein instead of said second logical value; and combining at least portions of said second content with said first content in a pre-defined manner, without decrypting said first encrypted content, to produce a composite encrypted host content with embedded auxiliary information, wherein said composite encrypted host content is decryptable using said first encryption key or said first set of encryption keys.

27. A method for embedding auxiliary information into an encrypted host content, comprising:

receiving a first content and a second content from a pre-processing center, said first content having been produced by (a) obtaining a plurality of segments of an original host content (b) embedding each of said plurality of segments with a first logical value and (c) modifying each particular segment that is embedded with said first logical value with a corresponding segment from said original host content, said corresponding segment being perceptually similar to said particular segment that is embedded with said first logical value but lacking said embedded first logical value, said second content having been produced by (a) embedding a second logical value into said plurality of segments of said original host content and (b) modifying each particular segment that is embedded with said first logical value with a corresponding segment from said original host content, said corresponding segment being perceptually similar to said particular segment that is embedded with said second logical value but lacking said embedded second logical value; and combining said particular segments of first and second contents that are in unencrypted format with segments from an encrypted and unmarked version of said original host content in a pre-defined manner, without decrypting said encrypted and unmarked version of said original host content, to produce a composite encrypted host content with embedded auxiliary information, said encrypted and unmarked version of said original host content having been produced by encrypting segments of said original host content using a first encryption key or first set of encryption keys, wherein said composite encrypted host content is decryptable using said first encryption key or said first set of encryption keys.

\* \* \* \* \*